(12) United States Patent
Nagasawa

(10) Patent No.: US 9,623,835 B2
(45) Date of Patent: Apr. 18, 2017

(54) FOUR-POINT SEAT BELT DEVICE

(71) Applicant: FUJI JUKOGYO KABUSHIKI KAISHA, Tokyo (JP)

(72) Inventor: Isamu Nagasawa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/850,330

(22) Filed: Sep. 10, 2015

(65) Prior Publication Data

US 2016/0016534 A1    Jan. 21, 2016

Related U.S. Application Data

(62) Division of application No. 14/202,938, filed on Mar. 10, 2014, now Pat. No. 9,156,433.

(30) Foreign Application Priority Data

Mar. 15, 2013   (JP) ................................ 2013-054123
Mar. 15, 2013   (JP) ................................ 2013-054124

(Continued)

(51) Int. Cl.
*B60R 22/02* (2006.01)
*B60R 22/12* (2006.01)
(Continued)

(52) U.S. Cl.
CPC .......... *B60R 22/12* (2013.01); *A44B 11/2561* (2013.01); *B60R 22/023* (2013.01);
(Continued)

(58) Field of Classification Search
CPC ......... B60R 22/12; B60R 22/14; B60R 22/26; B60R 22/46; B60R 22/48;
(Continued)

(56) References Cited

U.S. PATENT DOCUMENTS 4,063,778 A * 12/1977 Chika .................... B60R 22/14
                                                               297/465
4,175,787 A    11/1979 Muskat
(Continued)

FOREIGN PATENT DOCUMENTS

DE    102010015443 A1 * 10/2011    ............. B60R 22/02
FR       2825959 A1 * 12/2002    ............. B60R 21/18
(Continued)

OTHER PUBLICATIONS

Japanese Office Action issued Oct. 4, 2016 in Japanese Patent Application No. 2013-054123 (5 pages including machine translation).

(Continued)

*Primary Examiner* — Laura Freedman
(74) *Attorney, Agent, or Firm* — Smith, Gambrell & Russell, LLP

(57) ABSTRACT

A four-point seat belt device includes two shoulder belts to press the shoulders of a passenger sitting in a seat, a restraint element extending between the two shoulder belts, and a driving unit arrangement to perform winding of the belts upon detection of a collision.

21 Claims, 20 Drawing Sheets

(30) Foreign Application Priority Data

Mar. 15, 2013 (JP) ................................ 2013-054125
Mar. 15, 2013 (JP) ................................ 2013-054126

(51) Int. Cl.

| | |
|---|---|
| B60R 22/14 | (2006.01) |
| B60R 22/26 | (2006.01) |
| B60R 22/46 | (2006.01) |
| B60R 22/48 | (2006.01) |
| A44B 11/25 | (2006.01) |

(52) U.S. Cl.

CPC .............. *B60R 22/26* (2013.01); *B60R 22/48* (2013.01); *B60R 22/14* (2013.01); *B60R 2022/027* (2013.01); *B60R 2022/263* (2013.01); *B60R 2022/4609* (2013.01); *B60R 2022/4666* (2013.01); *B60R 2022/4816* (2013.01)

(58) Field of Classification Search

CPC ........ B60R 2022/027; B60R 2022/263; B60R 2022/4609; B60R 2022/4666; B60R 2022/4816; B60R 2022/4858; A44B 11/2561

See application file for complete search history.

(56) References Cited

U.S. PATENT DOCUMENTS

| | | | | |
|---|---|---|---|---|
| 4,563,023 | A * | 1/1986 | Clarkson | B60R 22/00 182/3 |
| 5,123,673 | A * | 6/1992 | Tame | B60R 22/03 100/268 |
| 5,562,326 | A * | 10/1996 | Stroud | B60R 22/14 297/465 |
| 6,076,894 | A | 6/2000 | Busch | |
| 6,139,111 | A | 10/2000 | Pywell et al. | |
| 6,293,588 | B1 | 9/2001 | Clune | |
| 6,305,713 | B1 | 10/2001 | Pywell et al. | |
| 6,309,024 | B1 | 10/2001 | Busch | |
| 6,375,270 | B1 | 4/2002 | Sullivan et al. | |
| 6,769,716 | B2 | 8/2004 | Rouhana et al. | |
| 6,773,075 | B2 | 8/2004 | Rouhana et al. | |
| 6,817,629 | B2 | 11/2004 | Herberg et al. | |
| 7,000,994 | B2 * | 2/2006 | Leighton | B60R 22/02 297/475 |
| 7,131,668 | B2 * | 11/2006 | Go | B60N 2/4221 280/801.2 |
| 7,144,085 | B2 * | 12/2006 | Vits | B60N 2/265 297/483 |
| 7,201,399 | B2 | 4/2007 | Frank et al. | |
| 7,249,784 | B2 * | 7/2007 | Bostrom | B60R 22/02 280/735 |
| 7,488,038 | B2 * | 2/2009 | Boyle | B60N 2/2806 297/250.1 |
| 7,513,558 | B2 | 4/2009 | Hansen | |
| 7,625,048 | B2 | 12/2009 | Rouhana et al. | |
| 7,775,557 | B2 * | 8/2010 | Bostrom | B60R 22/343 180/268 |
| 7,938,447 | B2 * | 5/2011 | Miyagawa | B60R 22/02 280/801.1 |
| 8,007,001 | B2 * | 8/2011 | Lin | B60N 2/4882 280/733 |
| 8,016,318 | B2 | 9/2011 | Nezaki | |
| 8,020,939 | B2 * | 9/2011 | Stasiak | B60N 2/2812 297/466 |
| 8,066,303 | B2 | 11/2011 | Nezaki | |
| 8,684,414 | B1 * | 4/2014 | McBride | B60R 22/02 280/801.1 |
| 9,120,448 | B2 * | 9/2015 | Nagasawa | B60R 21/01544 |
| 9,156,433 | B2 * | 10/2015 | Nagasawa, Sr. | B60R 22/12 |
| 2002/0089163 | A1 * | 7/2002 | Bedewi | B60R 22/02 280/801.1 |
| 2004/0113412 | A1 * | 6/2004 | Go | B60N 2/4221 280/808 |
| 2004/0251675 | A1 | 12/2004 | Herberg et al. | |
| 2008/0018156 | A1 * | 1/2008 | Hammarskjold | B60N 2/688 297/354.1 |
| 2009/0256337 | A1 * | 10/2009 | Pan | B60R 21/18 280/733 |
| 2009/0322067 | A1 | 12/2009 | Nezaki | |
| 2014/0265292 | A1 | 9/2014 | Nagasawa, Sr. | |
| 2014/0303851 | A1 | 10/2014 | Nagasawa, Sr. | |

FOREIGN PATENT DOCUMENTS

| | | | |
|---|---|---|---|
| JP | S60-001054 | | 1/1985 |
| JP | 2002316615 A | * | 10/2002 |
| JP | 2004-330975 | | 11/2004 |
| JP | 2007-106355 | | 4/2007 |
| JP | 2007186058 A | * | 7/2007 |
| JP | 2008-024134 | | 2/2008 |
| JP | 2009-090957 | | 4/2009 |
| JP | 2009-190590 | | 8/2009 |
| JP | 2009241909 A | * | 10/2009 |
| JP | 2009269550 A | * | 11/2009 |
| JP | 2009274541 A | * | 11/2009 |
| JP | 2010-023688 | | 2/2010 |
| JP | 2010-058679 | | 3/2010 |
| JP | 2011-098699 | | 5/2011 |

OTHER PUBLICATIONS

Japanese Office Action issued Oct. 4, 2016 in Japanese Patent Application No. 2013-054124 (5 pages including machine translation).

Japanese Office Action issued Oct. 4, 2016 in Japanese Patent Application No. 2013-054125 (6 pages including machine translation).

Japanese Office Action issued Oct. 4, 2016 in Japanese Patent Application No. 2013-054126 (5 pages including machine translation).

Japanese Office Action issued Jan. 10, 2017 in Japanese Patent Application No. 2013-054124 (7 pages including machine translation).

Japanese Office Action mailed Jan. 31, 2017 in Japanese Patent Application No. 2013-054123 (4 pages including machine translation).

\* cited by examiner

FOUR-POINT SEAT BELT DEVICE

CROSS REFERENCES TO RELATED APPLICATIONS

The present application claims priority from Japanese Patent Application Nos. 2013-054123, 2013-054124, 2013-054125, and 2013-054126, all filed on Mar. 15, 2013, the entire contents of which are hereby incorporated by reference.

BACKGROUND

1. Technical Field

The present invention relates to a four-point seat belt device installed in a vehicle such as an automobile or the like.

2. Related Art

Seat belts for securing safety of a passenger are attached to a vehicle such as an automobile or the like. There are in use four-point seat belts having shoulder belts for pressing both shoulders of a passenger, other than three-point seat belts. Technology has been disclosed in Japanese Unexamined Patent Application Publication (JP-A) No. 2004-330975 which aims to improve restraint performance in a four-point seat belt device. To this end, wind-up force of a lap belt for pressing the waist is set so as to be greater than wind-up force of a shoulder belt for pressing the shoulder.

Technology has been disclosed in JP-A No. 2010-58679 wherein the payout lengths of the lap belts and the payout lengths of the shoulder belts are detected in order to appropriately set wearing positions for lap belts and wearing positions for shoulder belts. Adjustment control is then performed based on the detected payout lengths so as to reduce difference between the payout lengths of the left and right lap belts, and difference between the payout lengths of the left and right shoulder belts.

However, employing the above-described four-point seat belt device does not always restrain a passenger in an appropriate manner. For example, in the case of a passenger having a protruding abdomen, the lap belt may ride up on the upper side of the abdomen in the case of rapid deceleration which incurs restriction by the belt. Wearing the lap belt in such a state may cause the chest, which is higher than the abdomen, to be strongly restrained, while portions of the body lower than the chest are not restrained.

Also, it is desirable for the lap belt pressing the waist to press and restrain the hipbone of passengers having a body type of which the abdomen does not protrude so far that the belt rides up on the upper side of the abdomen. However, even if the lap belt moves to the lower side of the abdomen, the passenger is consequently not restrained if the belt is in a loosened state. Also, the passenger may find troublesome having to perform the motion of forcibly extracting the lap belt by hand, and moving this to the lower side of the abdomen.

Thus, if the seat belt is loose at the time of wearing, the body of the passenger is not restrained. On the other hand, automatically winding up the seat belt immediately after the passenger puts on the seat belt may restrain the passenger's chest as described above. Also, unlike three-point seat belts, four-point seat belt device is buckled in front of the passenger. Accordingly, the belt is loose immediately after being worn, and is not positioned at the waist of the passenger. Therefore, the passenger has to bring the lap belts to his/her waist. It is desirable for a lap belt pressing the waist to automatically restrain the waist so as to press the hipbone, without the passenger having to perform a bothersome action. This is true for passengers with a body type where the abdomen does not protrude so far that the belt rides up on the upper side of the abdomen.

Thus, there is demand for a four-point seat belt device which restrains the body without troubling the passenger, in accordance with various body types of passengers.

SUMMARY OF THE INVENTION

The present invention has been designed in consideration of the circumstances described above, and an object thereof is to provide a four-point seat belt device configured to restrain a passenger's body, in accordance with various body types of passengers. Another object of the present invention is to provide a four-point seat belt device configured to restrain a passenger's body while suppressing looseness of the belt, in accordance with various body types of passengers.

Another object of the present invention is to provide a four-point seat belt device configured to restrain a passenger's body without troubling the passenger, in accordance with various body types of passengers. Another object of the present invention is to provide a four-point seat belt device configured to strain a passenger's body without looseness of the belt, in accordance with various body types of passengers.

An aspect of the present invention provides a four-point seat belt device including: two lap belts to press the hipbone of a passenger sitting in a seat; two shoulder belts to press both shoulders of the passenger; a driving unit to perform winding of the lap belts and the shoulder belts; and a latching detecting unit configured to detect a state in which the lap belts and the shoulder belts are latched via a buckle. In the case that the latching detecting unit has detected latching, the lap belts are controlled.

The lap belts may be temporarily loosened in the case that the latching detecting unit has detected latching.

The lap belts may be temporarily loosened by enabling at least one of the lap belts and the shoulder belts to be lengthened, in the case that the latching detecting unit has detected latching.

The driving unit may perform winding driving on the lap belts to reduce looseness after enabling at least one of the lap belts and the shoulder belts to be lengthened, in the case that the latching detecting unit has detected latching.

The driving unit may perform winding driving on the lap belts to reduce looseness after changing the state of at least one of the lap belts and the shoulder belts to an uncontrolled state, in the case that the latching detecting unit has detected latching.

The driving unit may perform operation in one of the states of winding, holding, and uncontrolled, before detection by the latching detecting unit, and in the case that the latching detecting unit has detected latching, temporarily loosen the lap belts by enabling at least one of the lap belts and the shoulder belts to be lengthened.

The lap belts may be forcibly moved to the hipbone, in the case that the latching detecting unit has detected latching.

The tensile force of the lap belts may be forcibly intensified to move the lap belts to the hipbone, in the case that the latching detecting unit has detected latching.

The driving unit may wind up the lap belts after enabling the lengths of the shoulder belts to be lengthened, in the case that the latching detecting unit has detected latching.

The lap belt may be distanced from a passenger, in the case that the latching detecting unit has detected latching.

The lap belts may be moved at least forward so as to distance the lap belts from a passenger, in the case that the latching detecting unit has detected latching.

The driving unit may perform winding driving on the lap belts to reduce looseness after enabling at least one of the lap belts and the shoulder belts to be lengthened, in the case that the latching detecting unit has detected latching.

The four-point seat belt device may further include: a guide member driving unit to drive a guide member to guide the lap belt; where the guide member driving unit is controlled to move the lap belts to at least either one of the forward direction and the downward direction so as to distance the lap belts from a passenger, in the case that the latching detecting unit has detected latching.

Winding driving may be performed on at least one of the lap belts and the shoulder belts after moving the lap belts to the hipbone, in the case that the latching detecting unit has detected latching.

Winding driving may be performed on at least one of the lap belts and the shoulder belts after elapsing of a predetermined amount time from detection, in the case that the latching detecting unit has detected latching.

The driving unit may perform winding driving of the lap belts after changing the state of at least one of the lap belts and the shoulder belts to an uncontrolled state during a predetermined amount of time from detection, in the case that the latching detecting unit has detected latching.

The driving unit may perform operation in one of the states of wind-up, holding, and uncontrolled, before the latching detecting unit has detected latching. In the case that the latching detecting unit has detected latching, the driving unit may enables at least one of the lap belts and the shoulder belts to be lengthened during a predetermined amount of time from detection.

DETAILED DESCRIPTION

Hereinafter, implementations of the present invention will be described based on the appended drawings.

First Implementation

Figure 1:
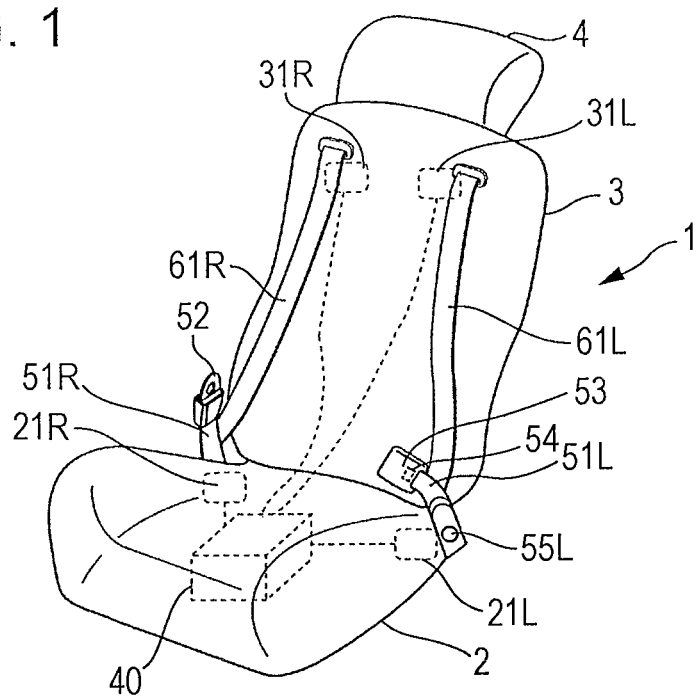
FIG. 1 is an overall perspective view of a four-point seat belt device according to a first implementation of the present invention.
Figure 2:
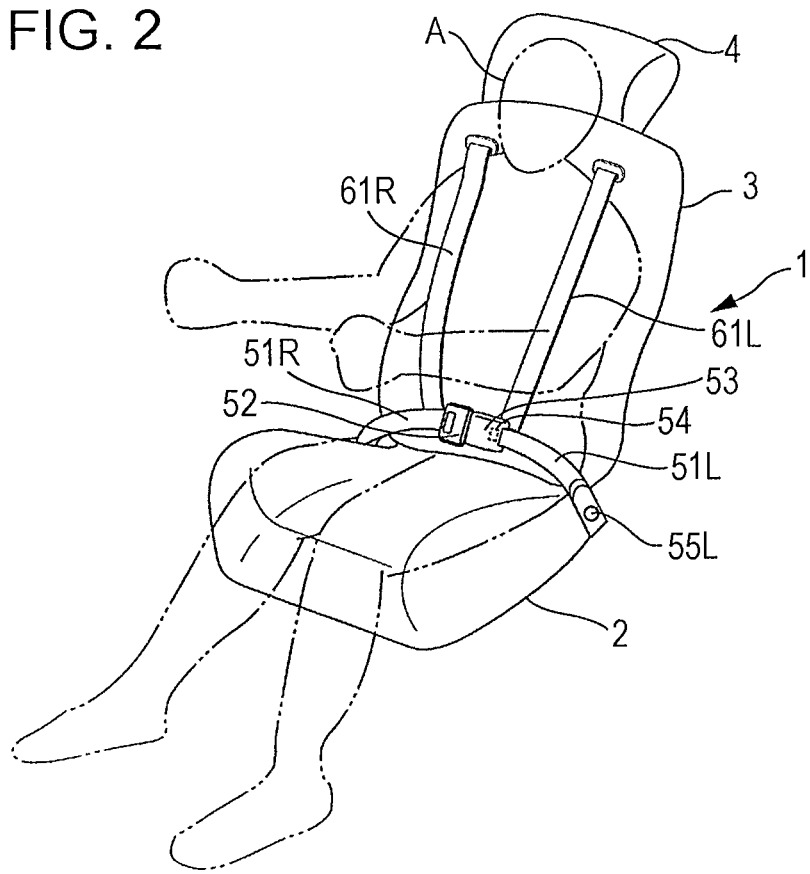
FIG. 2 is an overall perspective view of a state in which a passenger is wearing the four-point seat belt device according to the first implementation of the present invention.
Figure 3:
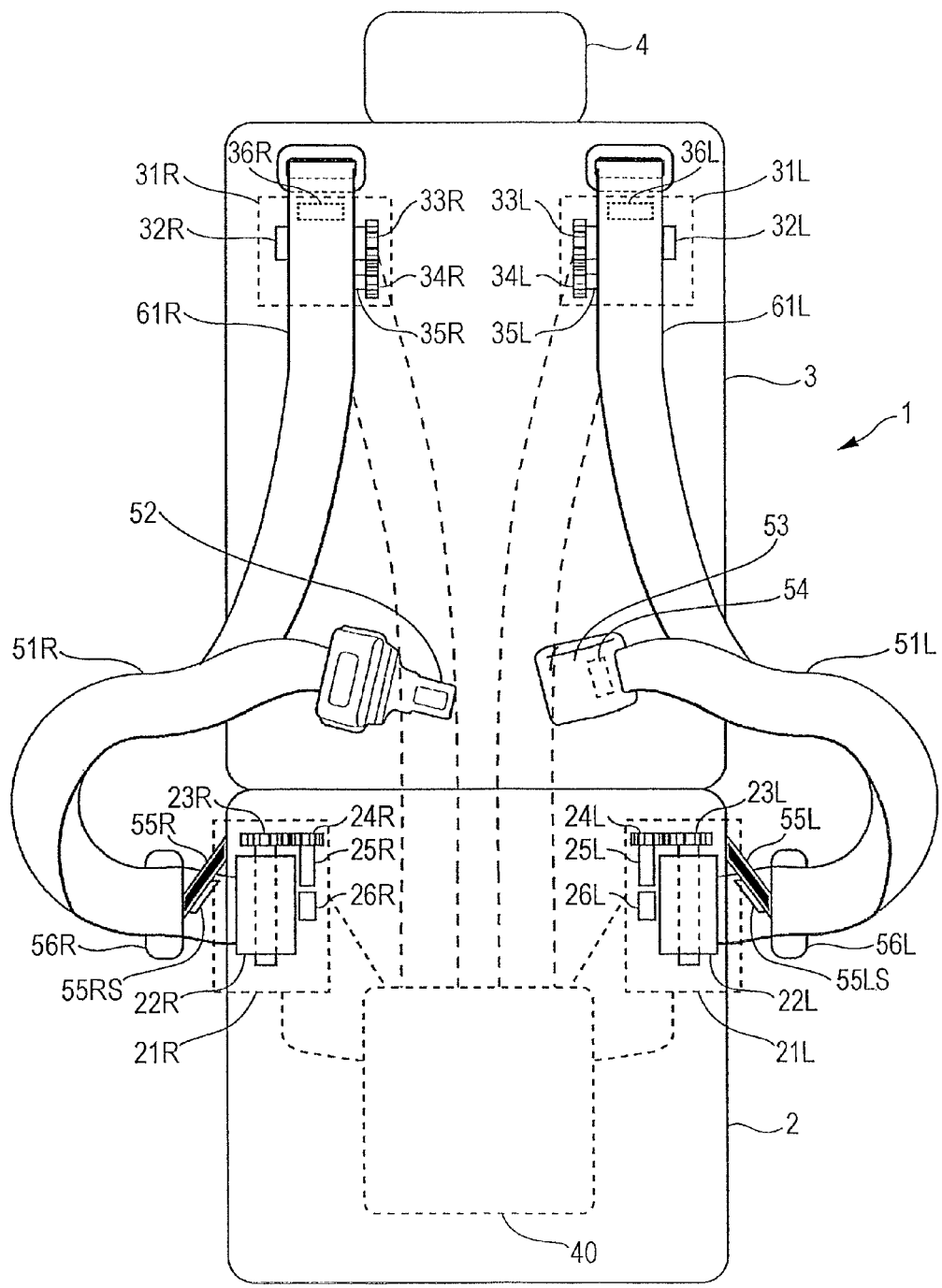
FIG. 3 is an overall front view of the four-point seat belt device according to the first implementation of the present invention.

FIGS. 1 to 8 illustrate a first implementation of the present invention. FIGS. 1 to 3 illustrate a basic configuration of the present invention. First, description will be made regarding a basic configuration of a four-point seat belt device 1 according to the first implementation of the present invention based on FIGS. 1 to 3.

FIG. 1 is an overall perspective view of the four-point seat belt device 1 according to the first implementation of the present invention. The seat of the four-point seat belt device 1 according to the first implementation of the present invention is configured including a seat cushion 2 where a passenger sits, which is a rectangular cushion disposed horizontally as to the vehicle body. The seat also includes a seat backrest 3, which is provided generally perpendicular to the seat cushion 2 behind the back of the passenger, and having an oblong shape of which angle the passenger adjusts. The set further includes a head cushion 4 configured including a rectangular cushion with which the passenger's head comes into contact, at the upper region of the seat backrest 3.

Also, a right lap belt 51R is turnably attached to a right side face of the seat cushion 2, which is the seat bottom of the seat of the four-point seat belt device 1, via a right lap belt turning unit 55R. A left lap belt 51L is turnably attached to a left side face of the seat cushion 2, which is the seat bottom of the seat of the four-point seat belt device 1, via a left lap belt turning unit 55L. The right lap belt 51R is wound up and held by a right retractor 21R serving as the driving unit. The left lap belt 51L is wound up and held by a left retractor 21L serving as the driving unit. The right lap belt 51R smoothly turns on the right lap belt turning unit 55R at the time of the passenger being seated. The left lap belt 51L smoothly turns on the left lap belt turning unit 55L at the time of seating of the passenger. The right retractor 21R may be provided closer to the center side of the seat cushion 2 than the right side face of the seat cushion 2. The left retractor 21L may be provided closer to the center side of the seat cushion 2 than the left side face of the seat cushion 2.

The right lap belt 51R, which is arranged so as to be extracted from the right retractor 21R, is provided to press the hipbone on the right side of the passenger who sits in the seat. The left lap belt 51L, which is arranged so as to be extracted from the left retractor 21L, is provided to press the hipbone on the left side of the passenger who sits in the seat.

A tongue plate 52 is provided to the tip of the right lap belt 51R in the extracting direction. A buckle 53 is provided to the tip of the left lap belt 51L in the extracting direction. A latching detecting unit 54, serving as the latching detecting unit configured to detect a state in which the buckle 53 and the tongue plate 52 are latched, i.e., a state in which the belts 51L and 51R are buckled, is provided to the buckle 53. The latching detecting unit 54 is electrically connected to a later-described control unit 40.

An upper right retractor 31R and an upper left retractor 31L serving as the driving unit is provided to the front upper region of the seat backrest 3 in a manner arrayed horizontally. The upper right retractor 31R is provided to generally the same height position as the right shoulder of the passenger who sits in the seat. The upper left retractor 31L is provided to generally the same height position as the left shoulder of the passenger who sits in the seat.

A right shoulder belt 61R to be extracted from the upper right retractor 31R is provided so as to press the right shoulder of the passenger who sits in the seat, and so as to be extracted. A left shoulder belt 61L to be extracted from the upper left retractor 31L is provided so as to press the left shoulder of the passenger who sits in the seat, and so as to be extracted. The tip in the extracting direction of the right shoulder belt 61R is connected to the right lap belt 51R. The tip in the extracting direction of the left shoulder belt 61L is connected to the left lap belt 51L.

Now, an arrangement may be made wherein the tip in the extracting direction of the right shoulder belt 61R is connected to the tongue plate 52, and the tip in the extracting direction of the left shoulder belt 61L is connected to the buckle 53. Also, the upper right retractor 31R may be provided to either of the roof and pillar. The upper left retractor 31L may be provided to either of the roof and pillar.

A control unit 40 controls the right retractor 21R serving as driving unit configured to perform winding of the right lap belt 51R, the left retractor 21L serving as driving unit configured to perform winding of the left lap belt 51L, the upper right retractor 31R serving as driving unit configured to perform winding of the right shoulder belt 61R, and the upper left retractor 31L serving as driving unit configured to perform winding of the left shoulder belt 61L. The control unit 40 is provided to the either of the lower region and seat bottom, or the like, of the seat cushion 2, for example.

FIG. 2 is an overall perspective view of a state in which a passenger A is wearing the four-point seat belt device 1 according to the first implementation of the present invention. The passenger A sits in the seat cushion 2 in a state in which the back comes into contact with the seat backrest 3. The head of the passenger A comes into contact with the head cushion 4. In FIG. 2, the right shoulder belt 61R is cast over the right shoulder of the passenger A. The left shoulder belt 61L is cast over the left shoulder of the passenger A. The right lap belt 51R and left lap belt 51L are latched by the tongue plate 52 and buckle 53, and are passed to the circumference of the hipbone. The right lap belt 51R and left lap belt 51L have a suitable angle corresponding to the body type of the passenger A through the right lap belt turning unit 55R and left lap belt turning unit 55L. This is a suitable seat belt wearing state.

Next, description will be made regarding the configurations of the four-point seat belt device 1 based on FIG. 3. FIG. 3 is an overall front view of the four-point seat belt device 1 according to the first implementation of the present invention.

The seat of the four-point seat belt device 1 is configured including, from the top, the head cushion 4 with which the head of the passenger comes into contact, the seat backrest 3 positioned behind the passenger, and the seat cushion 2 where the passenger sits.

The right retractor 21R is provided to the right side face of the seat cushion 2. The left retractor 21L is provided to the left side face of the seat cushion 2. The right retractor 21R serving as the driving unit is configured including a right pulley 22R and a right motor 25R, which are configured to wind up the right lap belt 51R. The left retractor 21L serving as the driving unit is configured including a left pulley 22L and a left motor 25L, which are configured to wind up the left lap belt 51L.

Also, the right lap belt 51R is turnably attached to the right retractor 21R via the right lap belt turning unit 55R, and smoothly turns when used by the passenger. The left lap belt 51L is turnably attached to the left retractor 21L via the left lap belt turning unit 55L, and smoothly turns when being used by the passenger.

The right retractor 21R includes the right pulley 22R configured to wind up the right lap belt 51R, a right rotary gear 23R provided to an end of the right pulley 22R, a right motor gear 24R configured to be engaged with the right rotary gear 23R, a right motor 25R configured to rotate the right motor gear 24R, and a right sensor 26R configured to detect the extracting length and tensile force of the right lap belt 51R. Specifically, the right retractor 21R of the right side face of the seat cushion 2 is configured so that the right rotary gear 23R provided to the end of the right pulley 22R is engaged with the right motor gear 24R of the right motor 25R, and performs winding and extracting of the right lap belt 51R.

Also, the right sensor 26R configured to detect the extracting length and tensile force of the right lap belt 51R is provided. Thus, based on the information of the right sensor 26R, the right motor 25R can be activated to rotate the right pulley 22R. Accordingly, the tensile force and extracting length of the right lap belt 51R can be controlled.

Thus, the right retractor 21R operates as a driving unit configured to perform one of loosening retracting force in a direction in which the right lap belt 51R is retracted, lengthening the length of the right lap belt 51R, and going to a state in which the length of the right lap belt 51R can be lengthened. The right retractor 21R performs winding and holding of the right lap belt 51R. Note that, at the time of the uncontrolled state, the right retractor 21R is in a state in which the right retractor 21R does not perform the winding and holding of the right lap belt 51R.

The left retractor 21L includes the left pulley 22L configured to wind up the left lap belt 51L, a left rotary gear 23L provided to an end of the left pulley 22L, a left motor gear 24L configured to be engaged with the left rotary gear 23L, a left motor 25L configured to rotate the left motor gear 24L, and a left sensor 26L configured to detect the extracting length and tensile force of the left lap belt 51L. Specifically, the left retractor 21L of the left side face of the seat cushion 2 is configured so that the left rotary gear 23L provided to the end of the left pulley 22L is engaged with the left motor gear 24L of the left motor 25L, and performs winding and extracting of the left lap belt 51L.

Also, there is provided the left sensor 26L configured to detect the extracting length and tensile force of the left lap belt 51L. Thus, based on the information of the left sensor 26L, the left motor 25L can be activated to rotate the left pulley 22L. Accordingly, the tensile force and extracting length of the left lap belt 51L can be controlled.

Thus, the left retractor 21L operates as a driving unit configured to perform one of loosening retracting force in a direction in which the left lap belt 51L is retracted, lengthening the length of the left lap belt 51L, and going to a state in which the length of the left lap belt 51L can be lengthened. The left retractor 21L performs winding and holding of the left lap belt 51L. Note that, at the time of the uncontrolled state, the left retractor 21L is in a state in which the left retractor 21L does not perform the winding and holding of the left lap belt 51L.

The upper right retractor 31R and upper left retractor 31L are provided to the front upper region side of the seat backrest 3 in a manner arrayed horizontally. The upper right retractor 31R is configured including an upper right pulley 32R configured to wind up the right shoulder belt 61R, an upper right rotary gear 33R provided to an end of the upper right pulley 32R, an upper right motor gear 34R configured to be engaged with the upper right rotary gear 33R, an upper right motor 35R configured to rotate the upper right motor gear 34R, and an upper right sensor 36R configured to detect the extracting length and tensile force of the right shoulder belt 61R. Specifically, the upper right retractor 31R on the right side of the front face upper region of the seat backrest 3 is configured so that the upper right rotary gear 33R provided to the end of the upper right pulley 32R is engaged with the upper right motor gear 34R of the upper right motor 35R, and performs winding and extracting of the right shoulder belt 61R. Also, there is provided the upper right sensor 36R configured to detect the extracting length and tensile force of the right shoulder belt 61R. Thus, based on the information of the upper right sensor 36R, the upper right motor 35R is activated to rotate the upper right pulley 32R, whereby the tensile force and extracting length of the right shoulder belt 61R can be controlled. Thus, the upper right retractor 31R operates as a driving unit configured to perform one of loosening retracting force in a direction in which the right shoulder belt 61R is retracted, lengthening the length of the right shoulder belt 61R, and going to a state in which the length of the right shoulder belt 61R can be lengthened. The upper right retractor 31R also performs winding and holding of the right shoulder belt 61R. Note that, at the time of the uncontrolled state, the upper right retractor 31R is in a state in which the upper right retractor 31R does not perform the winding and holding of the right shoulder belt 61R.

The upper left retractor 31L is configured including an upper left pulley 32L configured to wind up the left shoulder belt 61L, an upper left rotary gear 33L provided to an end of the upper left pulley 32L, an upper left motor gear 34L configured to be engaged with the upper left rotary gear 33L, an upper left motor 35L configured to rotate the upper left motor gear 34L, and an upper left sensor 36L configured to detect the extracting length and tensile force of the left shoulder belt 61L. Specifically, the upper left retractor 31L on the left side of the front face upper region of the seat backrest 3 is configured so that the upper left rotary gear 33L provided to the end of the upper left pulley 32L is engaged with the upper left motor gear 34L of the upper left motor 35L, and performs winding and extracting of the left shoulder belt 61L. Also, there is provided the upper left sensor 36L configured to detect the extracting length and tensile force of the left shoulder belt 61L.

Thus, the upper left retractor 31L operates as a driving unit configured to perform one of loosening retracting force in a direction in which the left shoulder belt 61L is retracted, lengthening the length of the left shoulder belt 61L, and going to a state in which the length of the left shoulder belt 61L can be lengthened. The upper left retractor 31L also performs winding and holding of the left shoulder belt 61L. Note that, at the time of the uncontrolled state, the upper left retractor 31L is in a state in which the upper left retractor 31L does not perform the winding and holding of the left shoulder belt 61L.

The tongue plate 52 is provided to the tip in the extracting direction of the right lap belt 51R. The buckle 53 is provided to the tip in the extracting direction of the left lap belt 51L. The latching detecting unit 54 configured to detect a state in which the buckle 53 and the tongue plate 52 are latched is provided to the buckle 53. The control unit 40 controls, according to a signal from the latching detecting unit 54, at least o either ne of the right retractor 21R and left retractor 21L which are driving units and the upper right retractor 31R and upper left retractor 31L which are driving units. This control is effected regarding the right lap belt 51R and left lap belt 51L, and the right shoulder belt 61R and left shoulder belt 61L, so as to perform one of loosening the retracting force in the retracting direction, lengthening the lengths, and enabling a state lengthening of the lengths thereof. This temporarily loosens the right lap belt 51R and left lap belt 51L.

The control unit 40 is provided to either one of the lower region and seat bottom of the seat cushion 2. The control unit 40 is electrically connected to each of the right motor 25R and right sensor 26R of the right retractor 21R which is a driving unit, the left motor 25L and left sensor 26L of the left retractor 21L which is a driving unit, the upper right motor 35R and upper right sensor 36R of the upper right retractor 31R which is a driving unit, the upper left motor 35L and upper left sensor 36L of the upper left retractor 31L which is a driving unit, and the latching detecting unit 54, and performs reception/transmission of signals. Note that the electrical connections may be made by either one of cable and radio.

In FIG. 3, two dotted lines from the right retractor 21R to the control unit 40 illustrate that the right motor 25R and right sensor 26R are electrically connected to the control unit 40 respectively, and two dotted lines from the left retractor 21L to the control unit 40 illustrate that the left motor 25L and left sensor 26L are electrically connected to the control unit 40 respectively. Also, two dotted lines from the upper right retractor 31R to the control unit 40 illustrate that the upper right motor 35R and upper right sensor 36R are electrically connected to the control unit 40 respectively, and two dotted lines from the upper left retractor 31L to the control unit 40 illustrate that the upper left motor 35L and upper left sensor 36L are electrically connected to the control unit 40 respectively.

Figure 4:
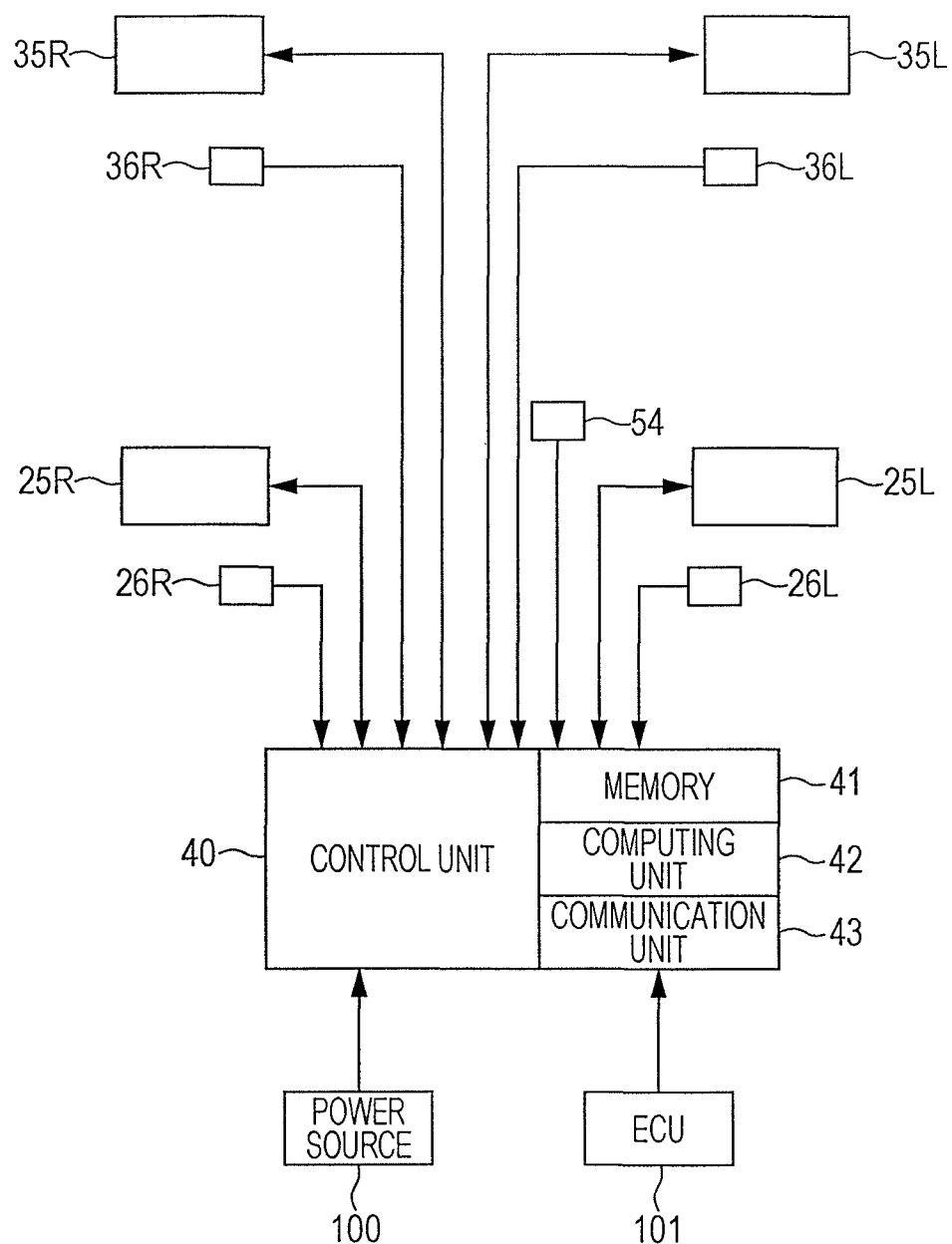
FIG. 4 is a block configuration diagram of the four-point seat belt device according to the first implementation of the present invention.
Figure 5:
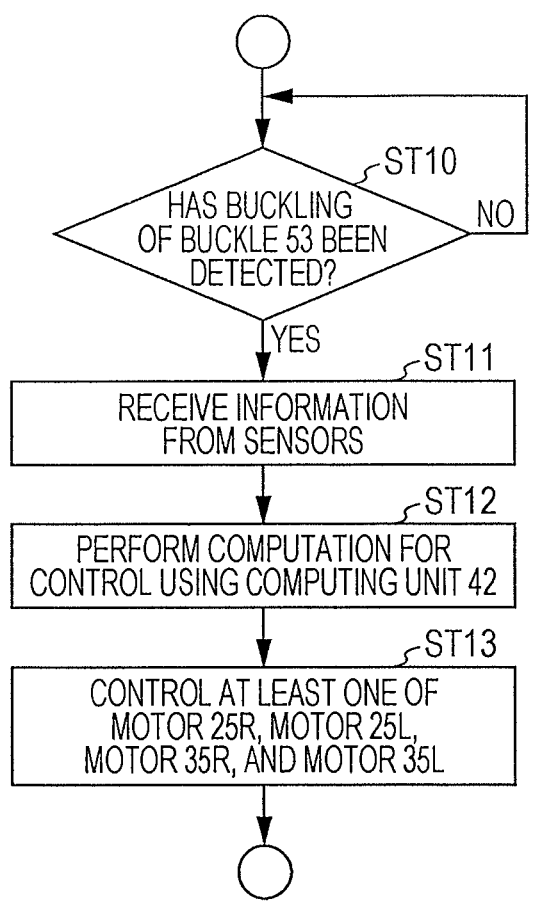
FIG. 5 is a flowchart of the four-point seat belt device according to the first implementation of the present invention.
Figure 6:
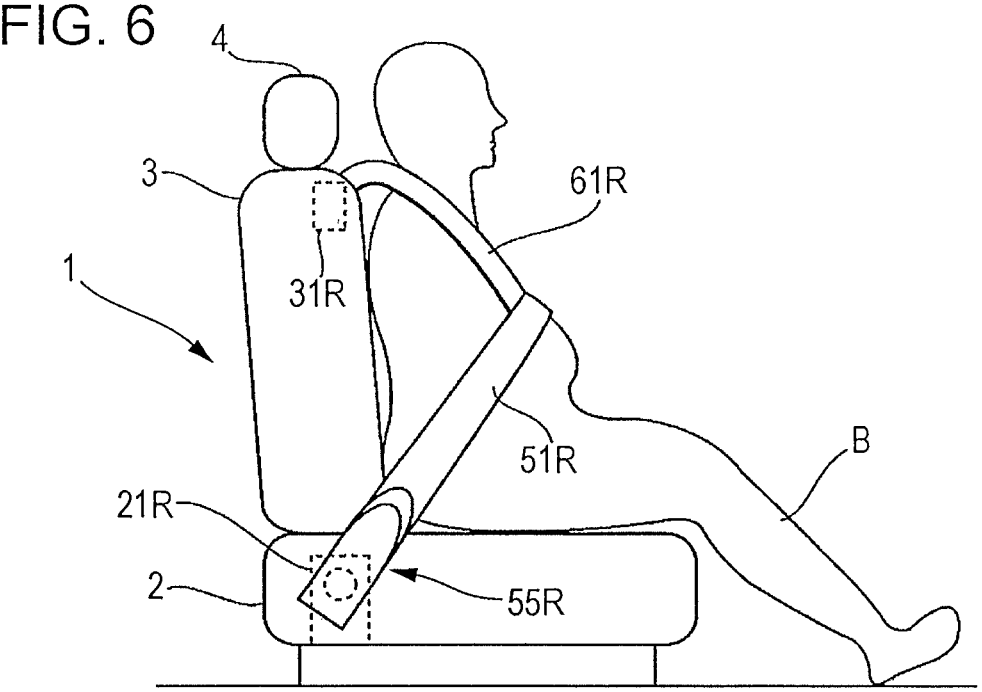
FIG. 6 is an operation state diagram as viewed from the side face of the four-point seat belt device according to the first implementation of the present invention.
Figure 7:
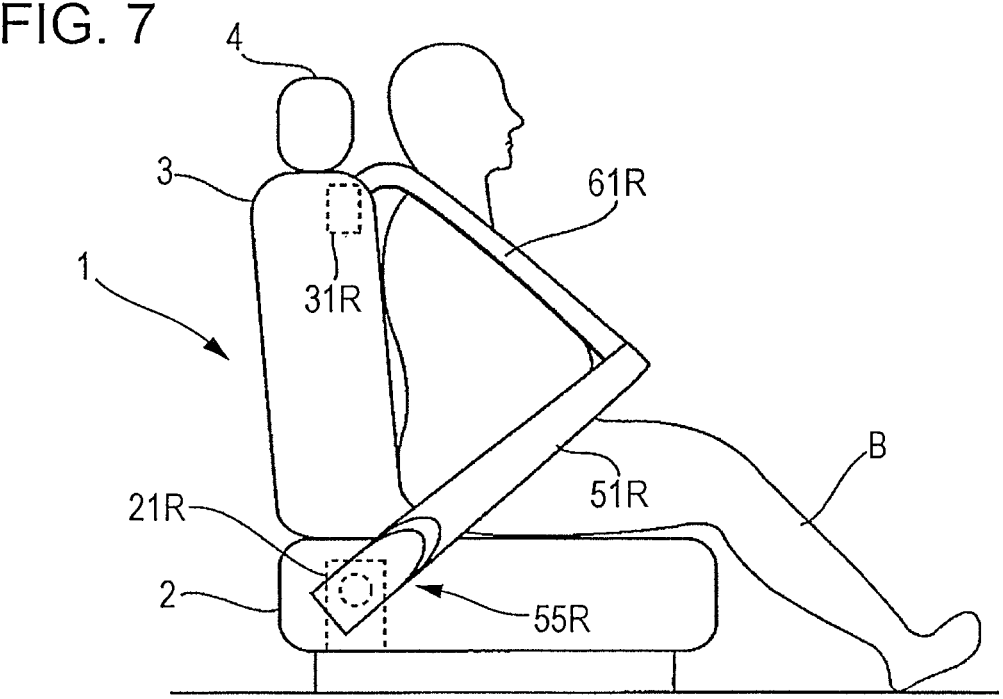
FIG. 7 is an operation state diagram as viewed from the side face of the four-point seat belt device according to the first implementation of the present invention.
Figure 8:
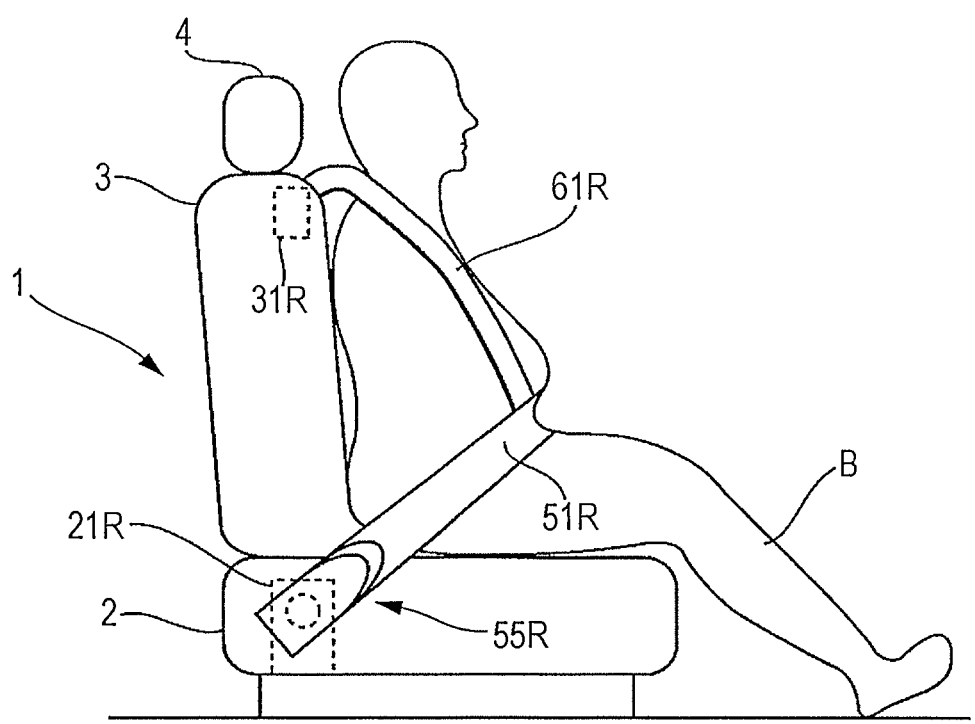
FIG. 8 is an operation state diagram as viewed from the side face of the four-point seat belt device according to the first implementation of the present invention.

Next, description will be made regarding operation of the four-point seat belt device 1 according to the first implementation of the present invention, with reference to FIGS. 4 to 8. FIG. 4 is a block configuration diagram of the four-point seat belt device 1 according to the first implementation of the present invention. FIG. 5 is a flowchart of the four-point seat belt device 1 according to the first implementation of the present invention. FIGS. 6 to 8 are operation state diagrams as viewed from the side face of the four-point seat belt device 1 according to the first implementation of the present invention. In FIGS. 6 to 8, the same configurations as with FIGS. 1 to 3 are denoted with the reference numerals used in FIGS. 1 to 3, and description thereof will be omitted as appropriate.

First, description will be made regarding the configurations connected to the control unit 40 with the control unit 40 as the center based on FIG. 4. The control unit 40 is configured including memory 41, a computing unit 42, and a communication unit 43. The control unit 40 is activated by receiving supply of power from a power source 100 such as a vehicle battery or the like. Also, the control unit 40 is electrically connected to an electric control unit (ECU) 101 of the vehicle, and obtains information of other units to be controlled by the vehicle. Thus, control of the four-point seat belt device 1 can be performed according this information. Alternatively, information of the four-point seat belt device 1 for the other units to be controlled by the vehicle can be transmitted to the ECU 101. For example, the control unit 40 controls the four-point seat belt device 1 according to a collision detecting signal.

The memory 41 stores information such as information for estimating a body type according to the lengths and tensile force of the right lap belt 51R, left lap belt 51L, right shoulder belt 61R, and left shoulder belt 61L, and body type information of a passenger B, and so forth. The computing unit 42 performs computation based on the information of the lengths and tensile force of the right lap belt 51R, left lap belt 51L, right shoulder belt 61R, and left shoulder belt 61L. The communication unit 43 performs communication with the right motor 25R and left motor 25L, right sensor 26R and left sensor 26L, upper right motor 35R and upper left motor 35L, upper right sensor 36R and upper left sensor 36L, latching detecting unit 54, and ECU 101.

First, an overview of the operation of the four-point seat belt device 1 will be described. The control unit 40 recognizes that the tongue plate and buckle which fix the seat belts are connected, and the seat belts are in a fixed state. At this time, the control unit 40 uses a seat belt winding device (uses an actuator such as a piston or the like, for example) to loosen the lap belts. Thus, the tongue plate, buckle, lap belts, or the like, fall by their own weight. In the case of confirming that these members have fallen to the passenger's thighs, the control unit 40 uses the seat belt winding device (uses an actuator such as a piston or the like, for example) to eliminate looseness of the belts. Note that the control unit 40 may perform control for eliminating looseness after elapsing of a certain period, instead of confirmation. Thus, the control unit 40 can obtain a belt wearing position in accordance with individual body types, which eliminates manual adjustments of the belts by the passenger after wearing of the seat belts. Also, this prevents the belts from having unnecessary looseness, and improves restraint performance at the time of a collision.

Next, an example of the operation of the four-point seat belt device 1 will be described based on the flowchart of the four-point seat belt device 1 according to the first implementation of the present invention in FIG. 5. The passenger B whose abdomen protrudes forward sits in the seat cushion 2, and extracts the right lap belt 51R from the right retractor 21R on the seat right side. The passenger B extracts the left lap belt 51L from the left retractor 21L on the seat left side. The passenger B latches the tongue plate 52 provided to the tip in the extracting direction of the right lap belt 51R, and the buckle 53 provided to the tip in the extracting direction of the left lap belt 51L. The latching detecting unit 54 detects latching between the tongue plate 52 and the buckle 53 to output a signal to the control unit 40 (step ST10). Note that, before detection by the latching detecting unit 54, the right retractor 21R, left retractor 21L, upper right retractor 31R, and upper left retractor 31L which are driving units, are in one of the states of wind-up, holding, and uncontrolled.

Upon the passenger B whose abdomen protrudes forward latching the tongue plate 52 and buckle 53, as illustrated in FIG. 6, the right lap belt 51R and left lap belt 51L in a state in which the tongue plate 52 and buckle 53 are latched come to the upper side of the passenger B's abdomen. In this state, the passenger B's body is not restrained.

The communication unit 43 receives information of extracting length of each belt and tensile force applied to each belt, from the right sensor 26R positioned in the right motor 25R of the right lap belt 51R, the left sensor 26L positioned in the left motor 25L of the left lap belt 51L, the upper right sensor 36R positioned in the upper right motor 35R of the right shoulder belt 61R, and the upper left sensor 36L positioned in the upper left motor 35L of the left shoulder belt 61L (step ST11).

The computing unit 42 of the control unit 40 performs computation based on the information of the extracting lengths and tensile force (step ST12). Next, the control unit 40 transmits, via the communication unit 43, a signal to at least one of the right motor 25R configured to control the extracting length and tensile force of the right lap belt 51R by driving, the left motor 25L configured to control the extracting length and tensile force of the left lap belt 51L by driving, the upper right motor 35R configured to control the extracting length and tensile force of the right shoulder belt 61R by driving, and the upper left motor 35L configured to control the extracting length and tensile force of the left shoulder belt 61L by driving to control the length and tensile force thereof (step ST13).

For example, as illustrated in FIG. 7, the control unit 40 outputs a control signal to the right motor 25R and left motor 25L so as to perform one of loosening retracting force in the retracting direction and lengthening the lengths of the right lap belt 51R and left lap belt 51L. Further, the control unit 40 outputs a control signal to the upper right motor 35R and upper left motor 35L so as to perform one of loosening retracting force in the retracting direction and lengthening the lengths of the right shoulder belt 61R and left shoulder belt 61L. Thus, the seat belts go to the uncontrolled state. That is to say, the seat belts (right lap belt 51R and left lap belt. 51L, right shoulder belt 61R and left shoulder belt 61L) either go to a state in which the lengths of the seat belts can readily be lengthened, or are lengthened. Accordingly, the seat belts can readily be positioned forward of the passenger B's abdomen. Also, the seat belts are lengthened and loosened, whereby the right lap belt 51R and left lap belt 51L fall downward due to the weight of the buckle 53.

Next, the control unit 40 outputs a control signal to at least one of the right motor 25R and left motor 25L, and the upper right motor 35R and upper left motor 35L. Thus, the control unit 40 winds up at least one of the right lap belt 51R and left lap belt 51L, and the right shoulder belt 61R and left shoulder belt 61L, and restrains, as illustrated in FIG. 8, the passenger B so that the right lap belt 51R and left lap belt 51L are at the lower part of the passenger B's abdomen and press the hipbone.

Second Implementation

Figure 9:
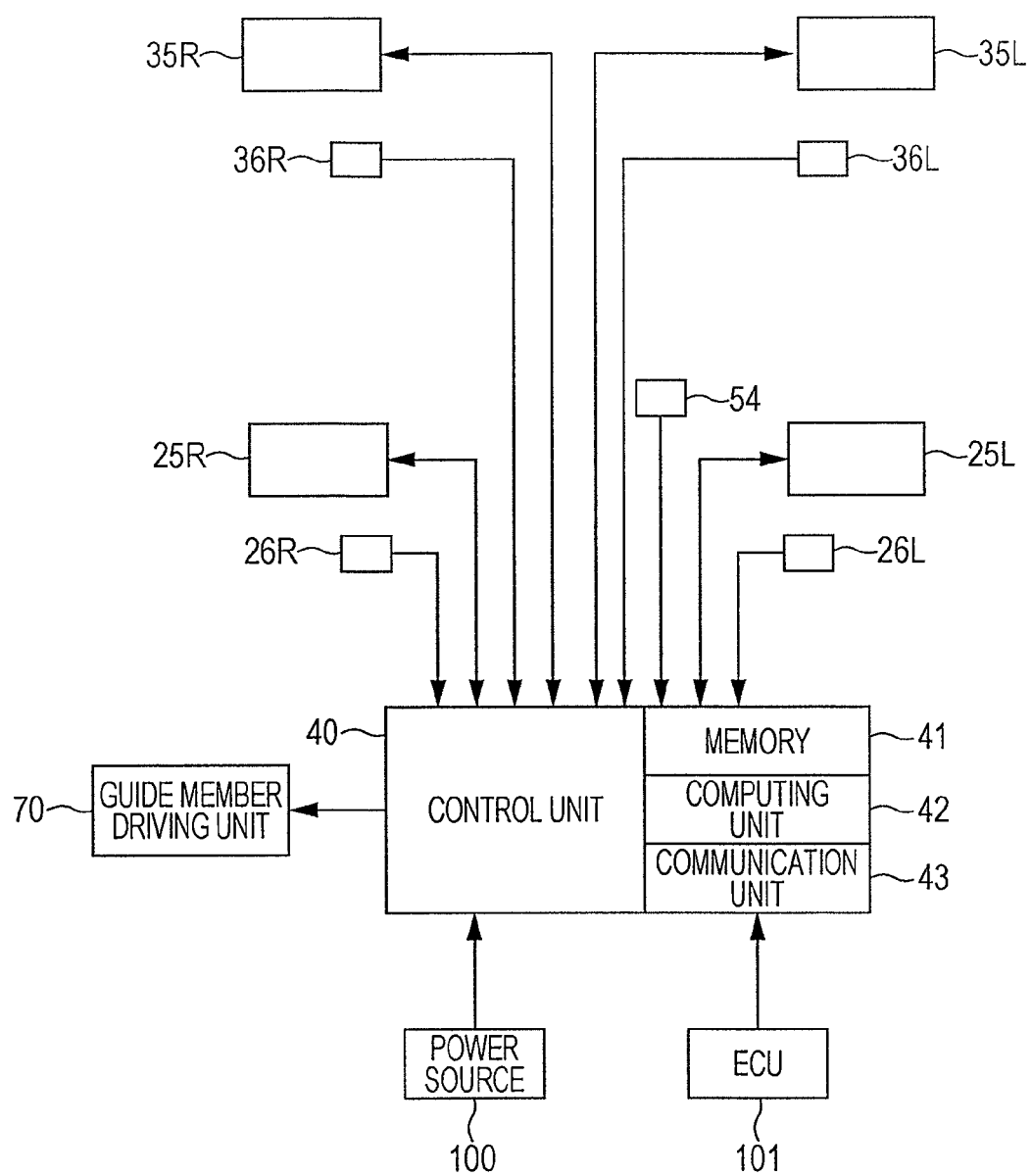
FIG. 9 is a block configuration diagram of a four-point seat belt device according to a second implementation of the present invention.
Figure 10:
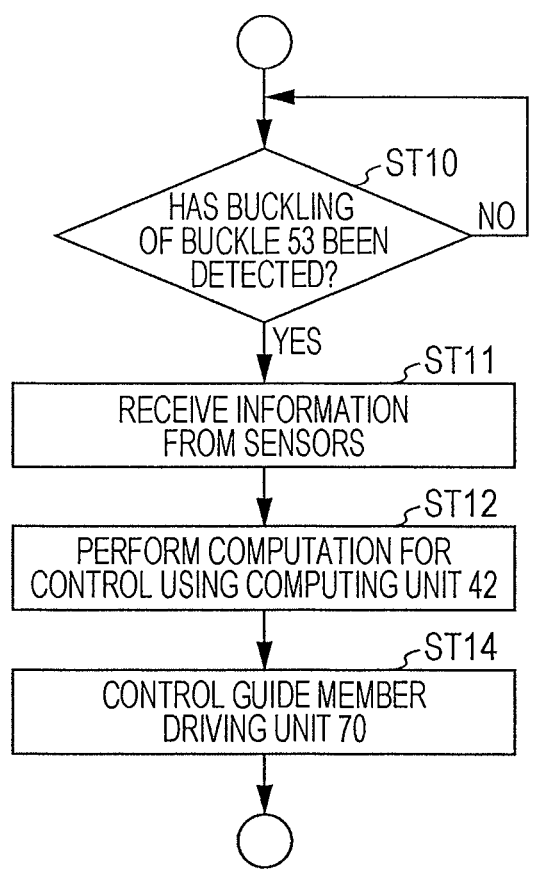
FIG. 10 is a flowchart of the four-point seat belt device according to the second implementation of the present invention.
Figure 11:
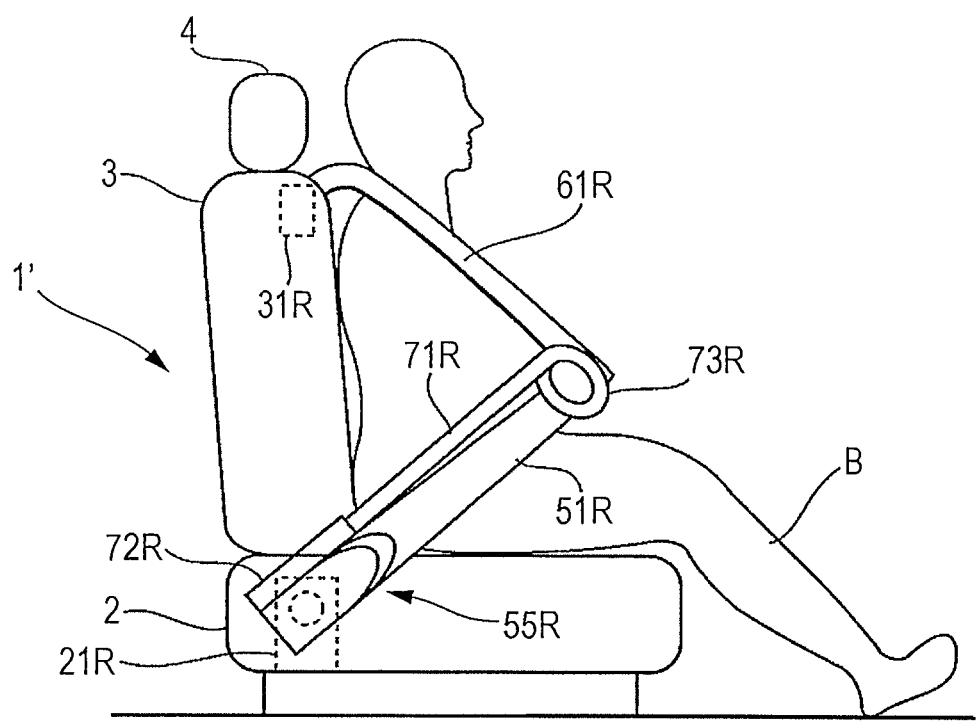
FIG. 11 is an operation state diagram as viewed from the side face of the four-point seat belt device according to the second implementation of the present invention.

FIGS. 9 to 11 illustrate a second implementation of the present invention. A four-point seat belt device 1' according to the second implementation of the present invention will be described based on FIGS. 9 to 11. FIG. 9 is a block configuration diagram of the four-point seat belt device 1' according to the second implementation of the present invention. FIG. 10 is a flowchart of the four-point seat belt device 1' according to the second implementation of the present invention. FIG. 11 is an operation state diagram as viewed from the side face of the four-point seat belt device 1' according to the second implementation of the present invention. Note that FIGS. 1 to 3 in the first implementation will be used regarding the basic configurations, and the same reference numerals used in the first implementation will be used as appropriate.

In FIG. 9, the same configurations as with FIG. 4 are denoted with the same reference numerals used in FIG. 4, and description will be omitted as appropriate. In FIG. 11, the same configurations as with FIGS. 6 to 8 are denoted with the same reference numerals used in FIGS. 6 to 8, and description will be omitted as appropriate.

The four-point seat belt device 1' according to the second implementation of the present invention includes a right guide member 71R configured to hold the right lap belt 51R in a state distanced from the seat. A lower end 72R of the right guide member 71R is an end of the right lap belt 51R, and is attached to the right retractor 21R. Also, an upper end 73R of the right guide member 71R supports the right lap belt 51R to guide the right lap belt 51R so as to be extracted in front of the passenger B at a portion closer to an end on the tongue plate 52 side of the right lap belt 51R. The right guide member 71R has an elastic configuration, and operates in response to latching between the tongue plate 52 and buckle 53. Though the right guide member 71R alone is provided in the second implementation, the guide member may be provided to both sides of the four-point seat belt device 1'. Next, the operation of the four-point seat belt device 1' according to the second implementation of the present invention will be described based on the flowchart in FIG. 10.

The passenger B whose abdomen protrudes forward sits in the seat cushion 2, and extracts the right lap belt 51R from the right retractor 21R on the seat right side. The passenger B extracts the left lap belt 51L from the left retractor 21L on the seat left side. The passenger B latches the tongue plate 52 provided to the tip in the extracting direction of the right lap belt 51R, and the buckle 53 provided to the tip in the extracting direction of the left lap belt 51L. The latching detecting unit 54 detects latching between the tongue plate 52 and the buckle 53 to output a signal to the control unit 40 (step ST10). Note that, before detection by the latching detecting unit 54, the right retractor 21R, left retractor 21L, upper right retractor 31R, and upper left retractor 31L which are driving units, are in one of the states of wind-up, holding, and uncontrolled.

Upon the passenger B whose abdomen protrudes forward latching the tongue plate 52 and buckle 53, as illustrated in FIG. 6, the right lap belt 51R and left lap belt 51L in a state in which the tongue plate 52 and buckle 53 are latched come to the upper side of the passenger B's abdomen. In this state, the passenger B's body is not restrained.

The communication unit 43 receives information of extracting length of each belt and tensile force applied to each belt, from the right sensor 26R positioned in the right motor 25R of the right lap belt 51R, the left sensor 26L positioned in the left motor 25L of the left lap belt 51L, the upper right sensor 36R positioned in the upper right motor 35R of the right shoulder belt 61R, and the upper left sensor 36L positioned in the upper left motor 35L of the left shoulder belt 61L (step ST11).

The computing unit 42 of the control unit 40 performs computation based on the information of the extracting lengths and tensile force (step ST12). The control unit 40 transmits a control signal to the guide member driving unit 70 based on the information obtained by the computing unit (step ST14).

For example, as illustrated in FIG. 11, in a state in which the tongue plate 52 provided to the tip in the extracting direction of the right lap belt 51R and the buckle 53 provided to the tip in the extracting direction of the left lap belt 51L are latched, the right guide member 71R expands. Thus, the right lap belt 51R and left lap belt 51L can be positioned forward or downward of the passenger B's abdomen.

Next, the control unit 40 outputs a control signal to at least one of the right motor 25R and left motor 25L and the upper right motor 35R and upper left motor 35L. Thus, the control unit 40 winds up at least one of the right lap belt 51R and left lap belt 51L, and the right shoulder belt 61R and left shoulder belt 61L, and restrains, as illustrated in FIG. 8, the passenger B so that the right lap belt 51R and left lap belt 51L are downward of the passenger B's abdomen and press the hipbone.

Third Implementation

FIGS. 12 to 16 illustrate a third implementation of the present invention. A four-point seat belt device 1" according to the third implementation of the present invention will be described based on FIGS. 12 to 16.

Figure 12:
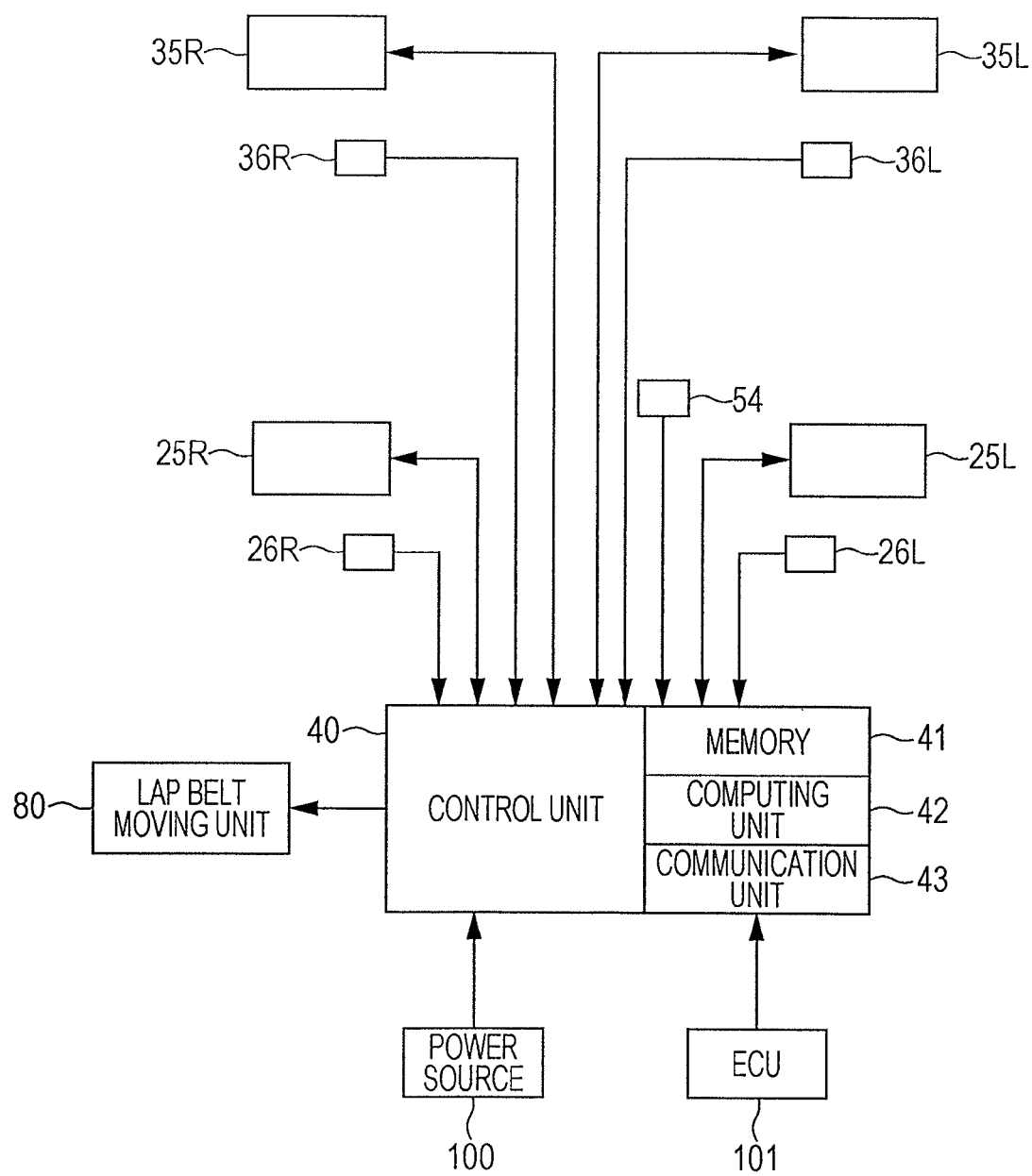
FIG. 12 is a block configuration diagram of a four-point seat belt device according to a third implementation of the present invention.
Figure 13:
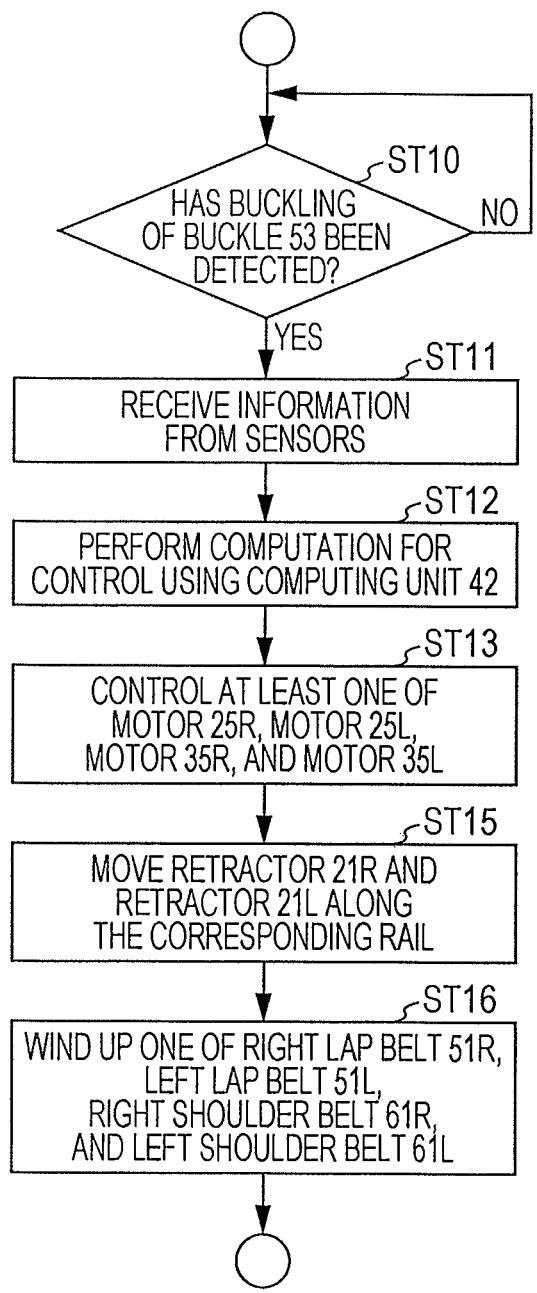
FIG. 13 is a flowchart of the four-point seat belt device according to the third implementation of the present invention.
Figure 14:
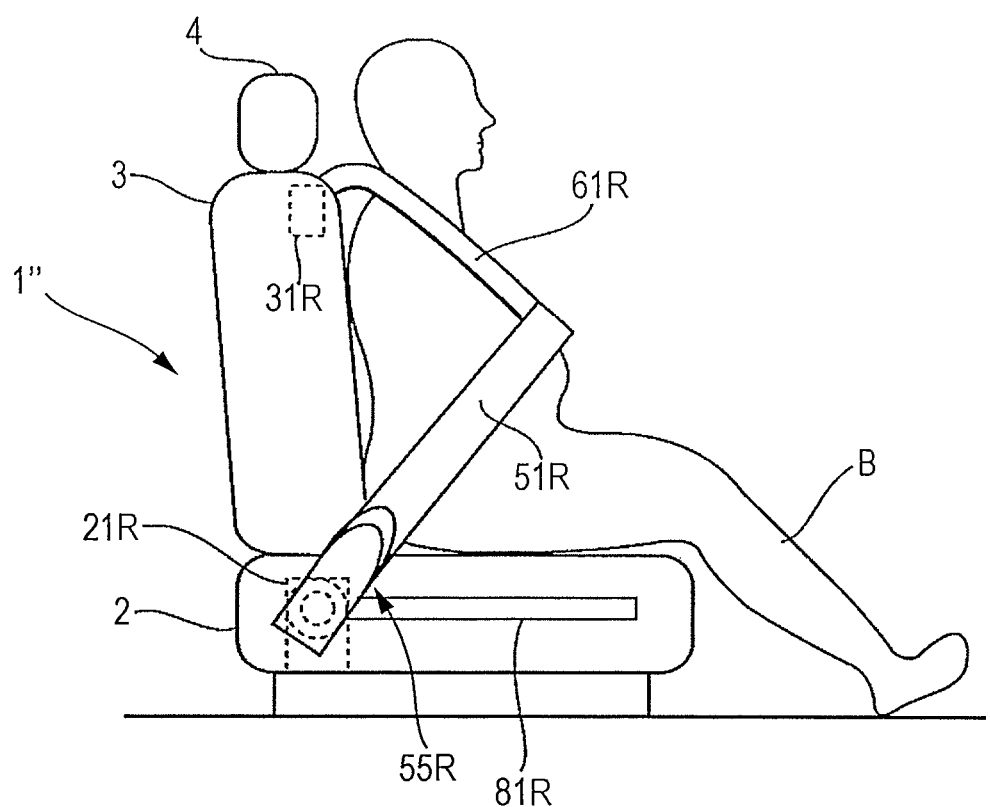
FIG. 14 is an operation state diagram as viewed from the side face of the four-point seat belt device according to the third implementation of the present invention.
Figure 15:
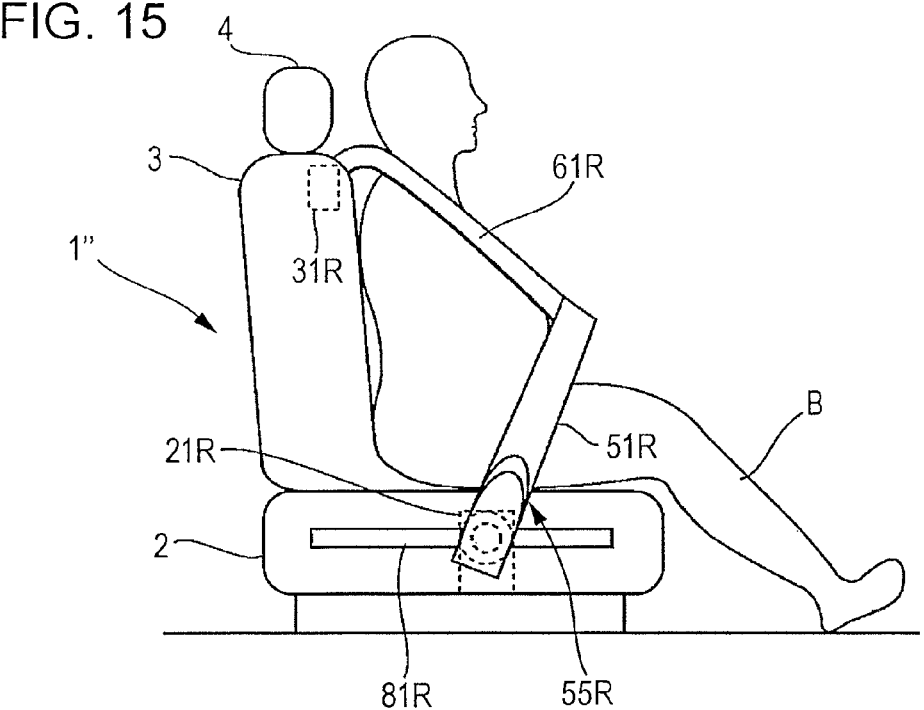
FIG. 15 is an operation state diagram as viewed from the side face of the four-point seat belt device according to the third implementation of the present invention.
Figure 16:
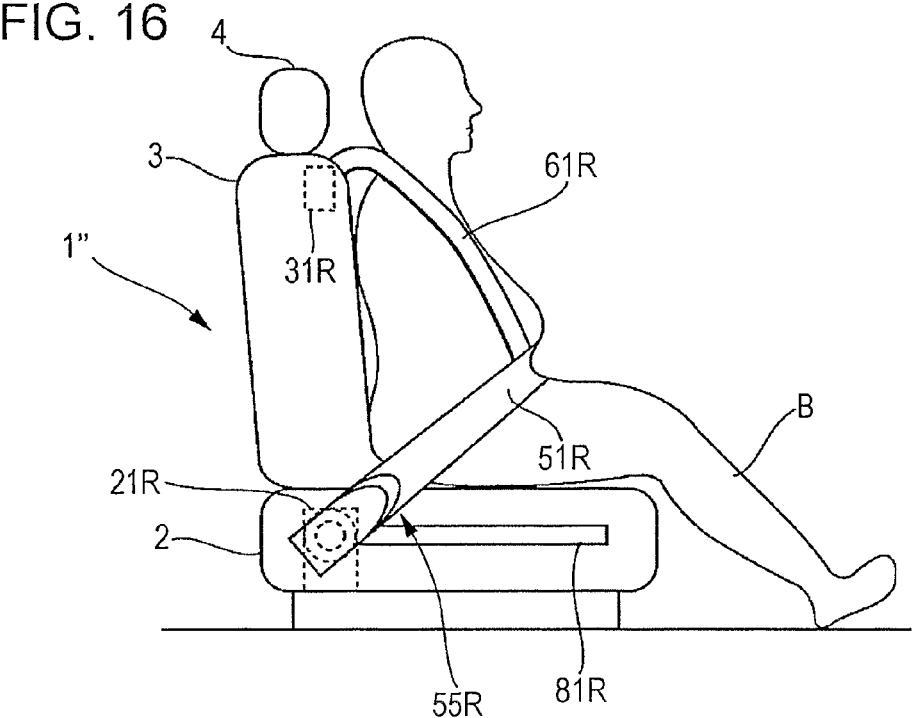
FIG. 16 is an operation state diagram as viewed from the side face of the four-point seat belt device according to the third implementation of the present invention.

FIG. 12 is a block configuration diagram of the four-point seat belt device 1" according to the third implementation of the present invention. FIG. 13 is a flowchart of the four-point seat belt device 1" according to the third implementation of the present invention. FIGS. 14 to 16 are operation state diagrams as viewed from the side face of the four-point seat belt device 1" according to the third implementation of the present invention. Note that FIGS. 1 to 3 in the first implementation will be used regarding the basic configurations, and the same reference numerals used in the first implementation will be used as appropriate.

In FIG. 12, the same configurations as with FIG. 4 are denoted with the same reference numerals used in FIG. 4, and description will be omitted as appropriate. In FIGS. 14 to 16, the same configurations as with FIGS. 6 to 8 are denoted with the same reference numerals used in FIGS. 6 to 8, and description will be omitted as appropriate.

The four-point seat belt device 1" according to the third implementation of the present invention includes a right lap belt moving rail 81R configured to move the right retractor 21R serving as the driving unit in the forward and backward direction of the vehicle on the right side of the side face of the seat cushion 2 along with the right lap belt 51R. Further, the four-point seat belt device 1" includes a left lap belt moving rail 81L configured to move the left retractor 21L serving as the driving unit in the forward and backward direction of the vehicle on the left side of the side face of the seat cushion 2 along with the left lap belt 51L. The right lap belt moving rail 81R and left lap belt moving rail 81L may be moved in a synchronous manner or an asynchronous manner. In the case of the present implementation, the right lap belt moving rail 81R and left lap belt moving rail 81L are moved forward and backward in a synchronous manner along with not only the right retractor 21R and left retractor 21L but also the right lap belt turning unit 55R and left lap belt turning unit 55L. Next, the operation of the four-point seat belt device 1" according to the third implementation of the present invention will be described based on the flowchart in FIG. 13.

The passenger B whose abdomen protrudes forward sits in the seat cushion 2, and extracts the right lap belt 51R from the right retractor 21R on the seat right side. The passenger B extracts the left lap belt 51L from the left retractor 21L on the seat left side. The passenger B latches the tongue plate 52 provided to the tip in the extracting direction of the right lap belt 51R, and the buckle 53 provided to the tip in the extracting direction of the left lap belt 51L. The latching detecting unit 54 detects latching between the tongue plate 52 and the buckle 53 to output a signal to the control unit 40 (step ST10). Note that, before detection by the latching detecting unit 54, the right retractor 21R, left retractor 21L, upper right retractor 31R, and upper left retractor 31L which are driving units, are in one of the states of wind-up, holding, and uncontrolled.

Upon the passenger B whose abdomen protrudes forward latching the tongue plate 52 and buckle 53, as illustrated in FIG. 6, the right lap belt 51R and left lap belt 51L in a state in which the tongue plate 52 and buckle 53 are latched come to the upper side of the passenger B's abdomen. In this state, the passenger B's body is not restrained.

The communication unit 43 receives information of extracting length of each belt and tensile force applied to each belt, from the right sensor 26R positioned in the right motor 25R of the right lap belt 51R, the left sensor 26L positioned in the left motor 25L of the left lap belt 51L, the upper right sensor 36R positioned in the upper right motor 35R of the right shoulder belt 61R, and the upper left sensor 36L positioned in the upper left motor 35L of the left shoulder belt 61L (step ST11).

The computing unit 42 of the control unit 40 performs computation based on the information of the extracting lengths and tensile force (step ST12). Next, the control unit 40 transmits, via the communication unit 43, a signal to at least at least one of the right motor 25R and the upper right motor 35R. The right motor 25R is configured to control the extracting length and tensile force of the right lap belt 51R by driving and the left motor 25L configured to control the extracting length and tensile force of the left lap belt 51L by driving. The upper right motor 35R is configured to control the extracting length and tensile force of the right shoulder belt 61R by driving and the upper left motor 35L configured to control the extracting length and tensile force of the left shoulder belt 61L by driving to control the length and tensile force thereof (step ST13). Thus, the control unit 40 enables the lengths of either the right lap belt 51R and left lap belt 51L, or right shoulder belt 61R and left shoulder belt 61L to be lengthened.

Next, the control unit 40 transmits a control signal to a lap belt moving unit 80 configured to move the right retractor 21R and left retractor 21L which are driving units along the right lap belt moving rail 81R and left lap belt moving rail 81L provided in the forward and backward direction of the vehicle. Thus, the lap belt moving unit 80 moves the right retractor 21R and left retractor 21L, whereby the right lap belt 51R and left lap belt 51L can be moved along the right lap belt moving rail 81R and left lap belt moving rail 81L (step ST15). As illustrated in FIG. 15, a position where the right lap belt 51R and left lap belt 51L are latched is positioned forward of the passenger B's abdomen.

Next, the control unit 40 controls at least one of the right motor 25R and left motor 25L, and the upper right motor 35R and upper left motor 35L, to wind up at least one of the right lap belt 51R and left lap belt 51L, and the right shoulder belt 61R and left shoulder belt 61L. The control unit 40 thus restrains the passenger B so that the right lap belt 51R and left lap belt 51L are at the lower part of the passenger B's abdomen and press the hipbone (step ST16).

As described above, the control unit 40 controls at least one of the right retractor 21R and left retractor 21L which are driving units, and the upper right retractor 31R and upper left retractor 31L which are driving units, so as to loosen retracting force in the retracting direction of at least one of the right lap belt 51R and left lap belt 51L, and the right shoulder belt 61R and left shoulder belt 61L, and to temporarily loosen the right lap belt 51R and left lap belt 51L. Next, the control unit 40 controls the right retractor 21R and left retractor 21L which are driving units to wind up the right lap belt 51R and left lap belt 51L to reduce looseness thereof.

Also, the control unit 40 controls, according to the signal from the latching detecting unit 54, at least one of the right retractor 21R and left retractor 21L, and the upper right retractor 31R and upper left retractor 31L, which are driving units, to lengthen at least one of the lengths of the right lap belt 51R and left lap belt 51L, and the right shoulder belt 61R and left shoulder belt 61L, and to temporarily loosen the right lap belt 51R and left lap belt 51L. Next, the control unit 40 controls the right retractor 21R and left retractor 21L which are driving units to wind up the right lap belt 51R and left lap belt 51L to reduce looseness thereof.

Fourth Implementation

Figure 17:
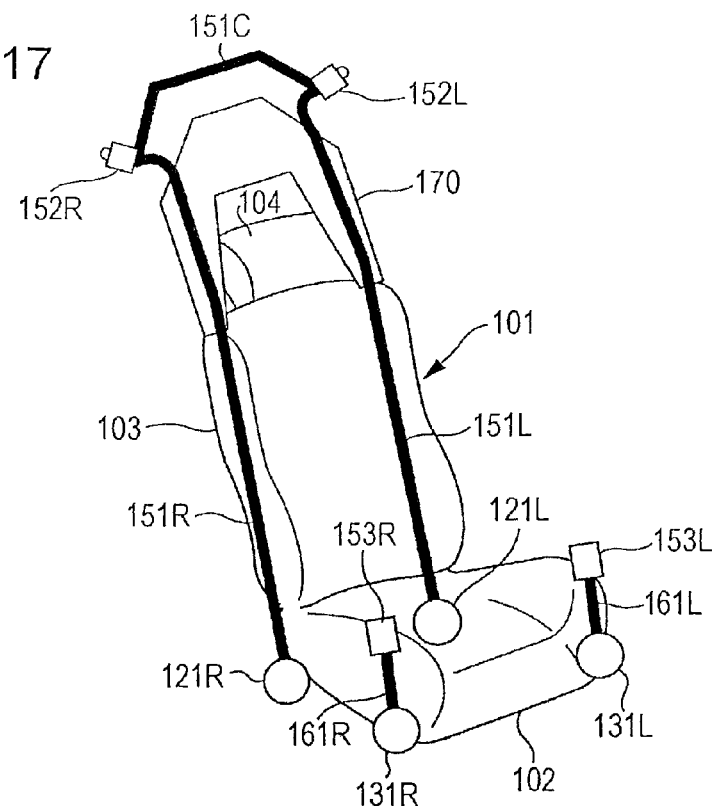
FIG. 17 is an overall perspective view of a four-point seat belt device according to a fourth implementation of the present invention.
Figure 18:
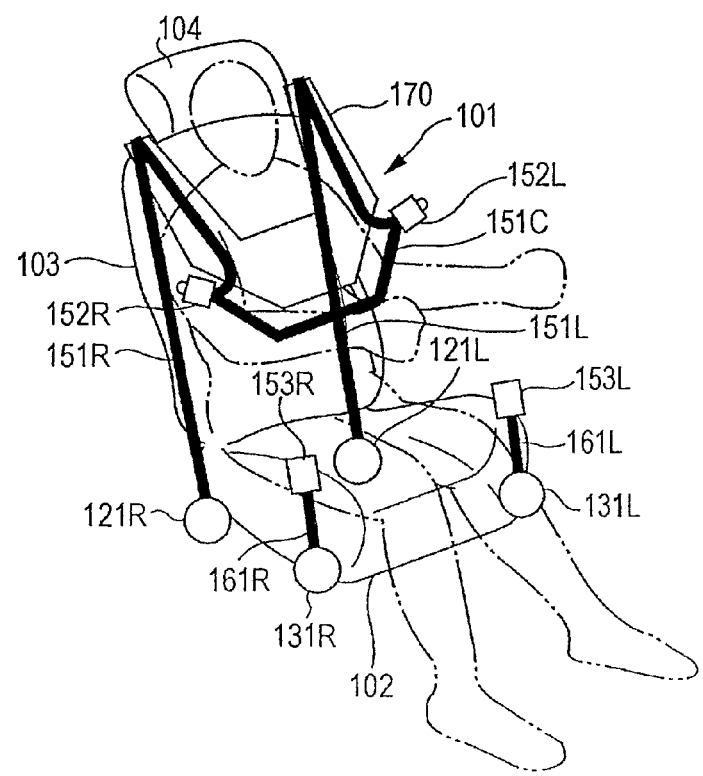
FIG. 18 is an overall perspective view of the four-point seat belt device according to the fourth implementation of the present invention.

FIGS. 17 to 18 illustrate a fourth implementation of the present invention. A four-point seat belt device 101 according to the fourth implementation of the present invention will be described based on FIGS. 17 to 18. FIGS. 17 and 18 are overall perspective views of the four-point seat belt device 101 according to the fourth implementation of the present invention.

The seat of the four-point seat belt device 101 according to the present implementation is configured including a seat cushion 102 where a passenger sits, configured including a rectangular cushion disposed horizontally as to the vehicle body, and a seat backrest 103, which is provided generally perpendicular to the seat cushion 102, positioned behind the passenger. The seat backrest 103 has an oblong shape of which angle the passenger adjusts. The seat also has a head cushion 104 with which the passenger's head comes into contact, configured including a rectangular cushion, which is on the upper region of the seat backrest 103.

Also, a right shoulder belt 151R is turnably attached to a right side face of the seat cushion 102 which is the seat bottom of the seat of the four-point seat belt device 101 via a right retractor 121R. A left shoulder belt 151L is turnably attached to a left side of the seat cushion 102 which is the seat bottom of the seat of the four-point seat belt device 101 via a left retractor 121L. The right retractor 121R may be provided closer to the center side of the seat cushion 102 than the right side face of the seat cushion 102. The left retractor 121L may be provided closer to the center side of the seat cushion 102 than the left side face of the seat cushion 102. The right shoulder belt 151R to be extracted from the right retractor 121R is provided so as to press the hipbone of a passenger sitting down in the seat, and so as to be extracted. The left shoulder belt 151L to be extracted from the left retractor 121L is provided so as to press the hipbone of a passenger sitting down in the seat, and so as to be extracted.

A right tongue plate 152R is provided to the tip in the extracting direction of the right shoulder belt 151R. A left tongue plate 152L is provided to the tip in the extracting direction of the left shoulder belt 151L. A lap belt 151C is provided between the right tongue plate 152R and left tongue plate 152L. The right tongue plate 152R and left tongue plate 152L are latched to a right front buckle 153R and a left front buckle 153L provided to the tips in the extracting directions of a right front belt 161R and a left front belt 161L which are connected to a right front retractor 131R and a left front retractor 131L, respectively.

A vest 170 having an apron-like shape is attached to the right shoulder belt 151R and left shoulder belt 151L. The vest 170 is provided to the long sides of the right shoulder belt 151R and left shoulder belt 151L. It is desirable for the vest 170 to be formed of a soft material. As illustrated in FIG. 17, the right shoulder belt 151R and left shoulder belt 151L are configured so that the vest 170 which is a soft material stands erect by itself. Also, a spring mechanism is provided so as to prevent the chest from being pressed. The end on the shoulder side of the vest 170 is configured so as to agree with the shoulder width of the passenger. Also, the lap belt 151C is configured so as to agree with the waist width of the passenger.

FIG. 17 illustrates a state in which the vest 170 stands erect by itself. FIG. 18 illustrates a state of the passenger of the four-point seat belt device 101 sitting in the seat and wearing the seat belts. At the time of wearing of the seat belts, as illustrated in FIG. 18, the vest 170 which stands erect is lowered so as to be reclined to the front side, thereby tightly putting the vest 170 on the passenger's chest.

Fifth Implementation

Figure 19:
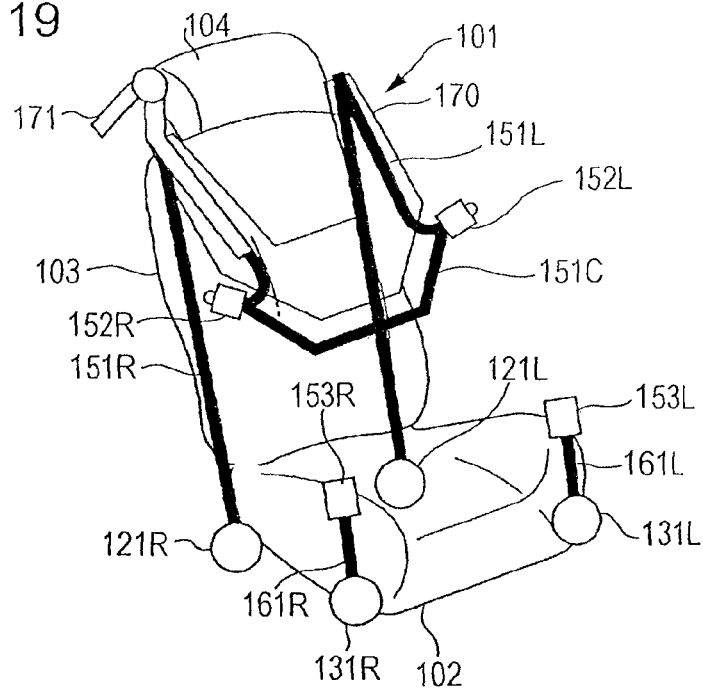
FIG. 19 is an overall perspective view of a four-point seat belt device according to a fifth implementation of the present invention.
Figure 20:
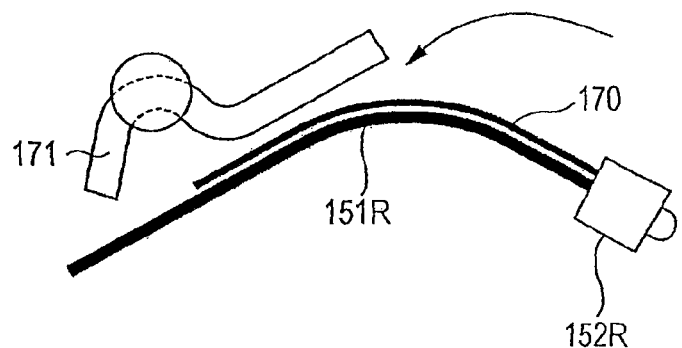
FIG. 20 is a principal portion enlarged view of the four-point seat belt device according to the fifth implementation of the present invention.
Figure 21:
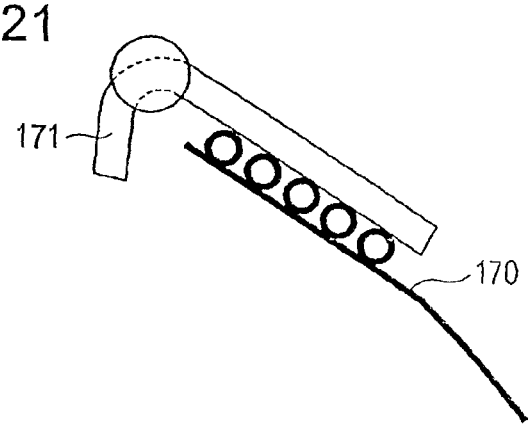
FIG. 21 is a principal portion enlarged view of the four-point seat belt device according to the fifth implementation of the present invention.

FIGS. 19 to 21 illustrate a fifth implementation of the present invention. A four-point seat belt device 1 according to the fifth implementation of the present invention will be described based on FIGS. 19 to 21. In FIG. 19, the same configurations as with FIGS. 17 and 18 are denoted with the reference numerals used in FIGS. 17 and 18, and description thereof will be omitted as appropriate.

FIG. 19 is an overall perspective view of the four-point seat belt device 1 according to the fifth implementation of the present invention. FIGS. 20 and 21 are principal portion enlarged views of the four-point seat belt device 1 according to the fifth implementation of the present invention.

The four-point seat belt device 1 according to the present implementation includes a hinge 171 configured to change the state of the vest 170 into a state standing erect by itself. The vest 170 is supported by the hinge 171 in a state standing erect by itself.

As illustrated in FIG. 20, upon confirming latching between the tongue of the hinge 171 and the inner belt of the right shoulder belt 151R before riding, the vest 170 is stored after the hinge 171 is disengaged by the hook. Upon confirming separation between the tongue of the hinge 171 and the inner belt of the right shoulder belt 151R, the hinge 171 pushes out to grab the hook.

As illustrated in FIG. 21, when the passenger wears the seat belts, the vest 170 bends using tension of the right shoulder belt 151R being wound up to the right retractor 121R to be integrated with the hinge mechanism. According to such a configuration, before the passenger wears the seat belts, the vest 170 stands erect so as not to be in the way, and when the passenger wears the seat belts, the vest 170 can be supported so that the vest 170 suitably covers the passenger's chest.

Sixth Implementation

Figure 22:
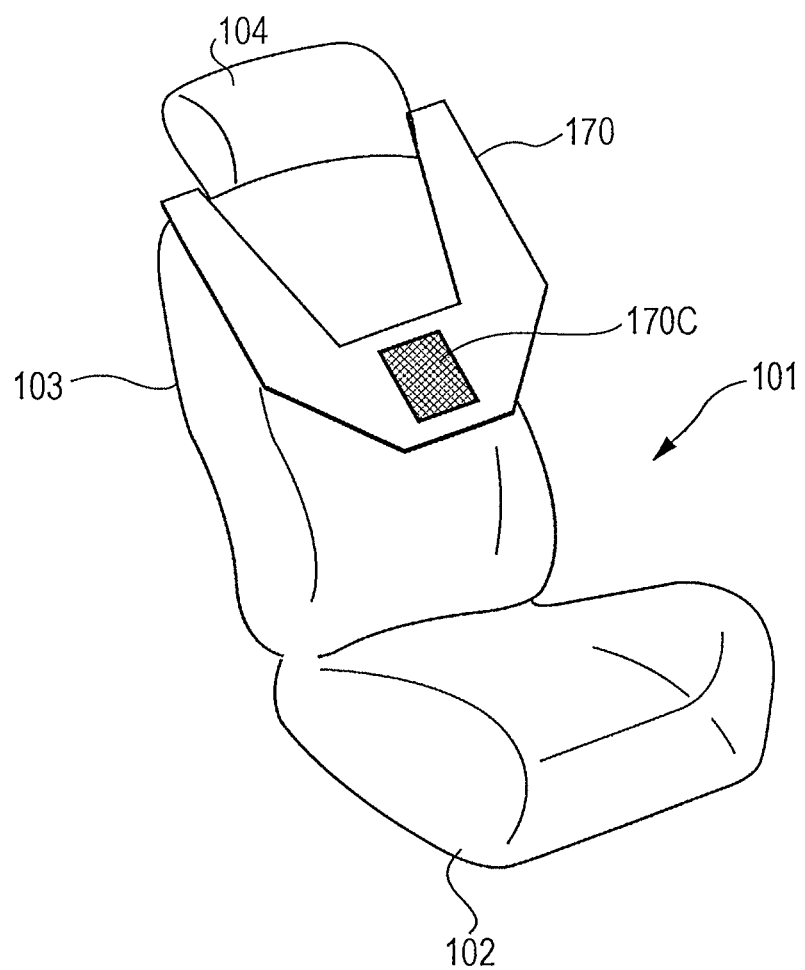
FIG. 22 is an overall perspective view of a four-point seat belt device according to a sixth implementation of the present invention.

FIG. 22 illustrates a sixth implementation of the present invention. A four-point seat belt device according to the sixth implementation of the present invention will be described based on FIG. 22. In FIG. 22, the same configurations as with FIGS. 17 and 18 are denoted with the reference numerals used in FIGS. 17 and 18, and description thereof will be omitted as appropriate.

FIG. 22 is an overall perspective view of the four-point seat belt device according to the sixth implementation of the present invention. A member 170C of the vest 170 with which the passenger's chest comes into contact is formed of a material which twists. Such a configuration prevents the driver's motions from being hindered. Also, the member 170C may be formed of a stretchable material. Such a configuration prevents poor displacement at the chest. The principal restraints of the passenger are performed at the right shoulder belt 151R and left shoulder belt 151L which suppress the collarbone and hipbone. The vest 170 has an advantage to restrain the passenger's quirking behavior softly without applying acceleration and displacement thereto.

Seventh Implementation

Figure 23:
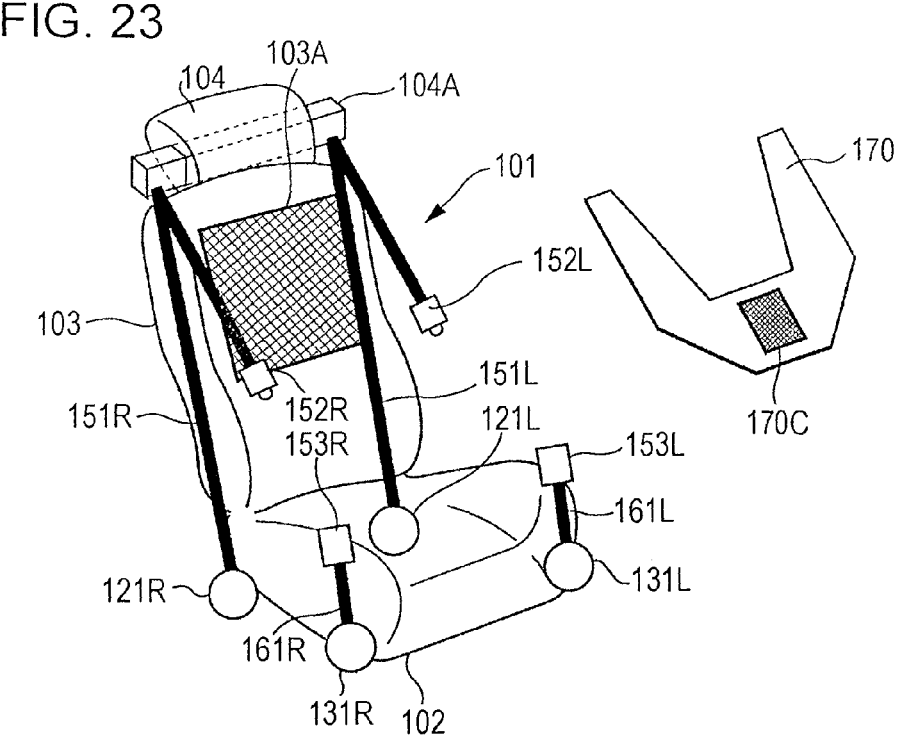
FIG. 23 is an overall perspective view of a four-point seat belt device according to a seventh implementation of the present invention.

FIG. 23 illustrates a seventh implementation of the present invention. A four-point seat belt device according to the seventh implementation of the present invention will be described based on FIG. 23. In FIG. 23, the same configurations as with FIGS. 17 and 18 are denoted with the reference numerals used in FIGS. 17 and 18, and description thereof will be omitted as appropriate.

FIG. 23 is an overall perspective view of the four-point seat belt device according to the seventh implementation of the present invention. The seat backrest 103 includes a pressure distribution detecting unit 103A configured to detect the positions of the passenger's shoulder blades. The head cushion 104 includes an actuator 104A for shoulder width configured to adjust positions equivalent to the positions of the passenger's shoulders at the right shoulder belt 151R and left shoulder belt 151L. Upon the passenger siting down in the seat of the four-point seat belt device 101, the pressure distribution detecting unit 103A detects the positions of the passenger's shoulder blades. Next, the actuator 104A for shoulder width adjusts positions equivalent to the positions of the passenger's shoulders at the right shoulder belt 151R and left shoulder belt 151L. Thus, the right shoulder belt 151R and left shoulder belt 151L can be adjusted according to the passenger's shoulder width. Note that, as illustrated in FIG. 23, the vest 170 is detachable, and can be used at the time of restraining the passenger's chest. The member 170C with which the passenger's chest comes into contact is formed of a material which twists.

Eighth Implementation

Figure 24:
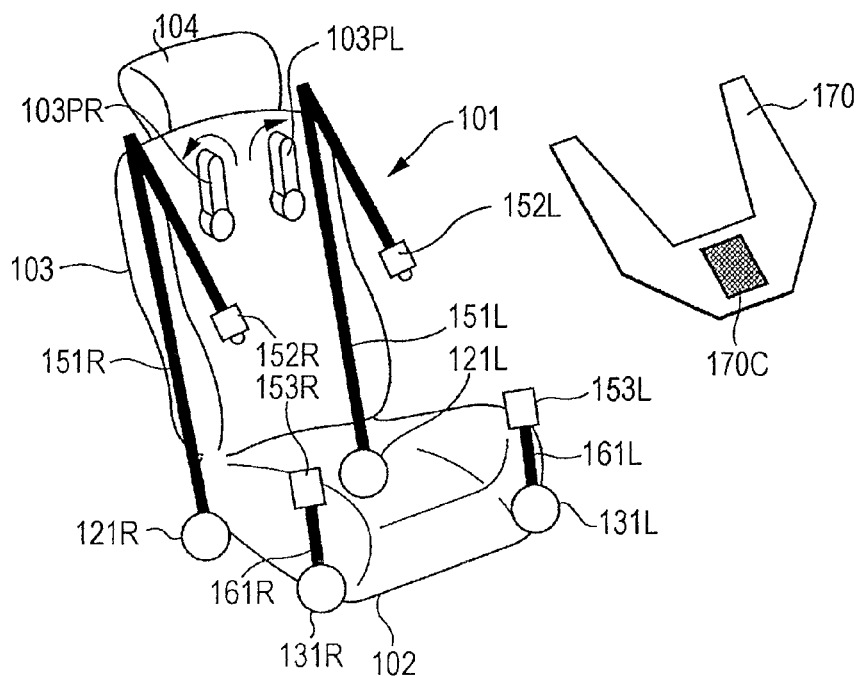
FIG. 24 is an overall perspective view of a four-point seat belt device according to an eighth implementation of the present invention.

FIG. 24 illustrates an eighth implementation of the present invention. A four-point seat belt device according to the eighth implementation of the present invention will be described based on FIG. 24. In FIG. 24, the same configurations as with FIGS. 17 and 18 are denoted with the reference numerals used in FIGS. 17 and 18, and description thereof will be omitted as appropriate.

FIG. 24 is an overall perspective view of the four-point seat belt device according to the eighth implementation of the present invention. A right paddle 103PR and a left paddle 103PL which are activated by the passenger's shoulder blades are provided to both sides of the seat backrest 103. The right paddle 103PR and left paddle 103PL are expanded according to the widths of the passenger's shoulder blades, and the tips of the paddles come into contact with the right shoulder belt 151R and left shoulder belt 151L, whereby the widths of the right shoulder belt 151R and left shoulder belt 151L can be adjusted according to the passenger's shoulder width. Note that, as illustrated in FIG. 24, the vest 170 is detachable, and can be used at the time of restraining the passenger's chest. The member 170C with which the passenger's chest comes into contact is formed of a material which twists.

Ninth Implementation

Figure 25:
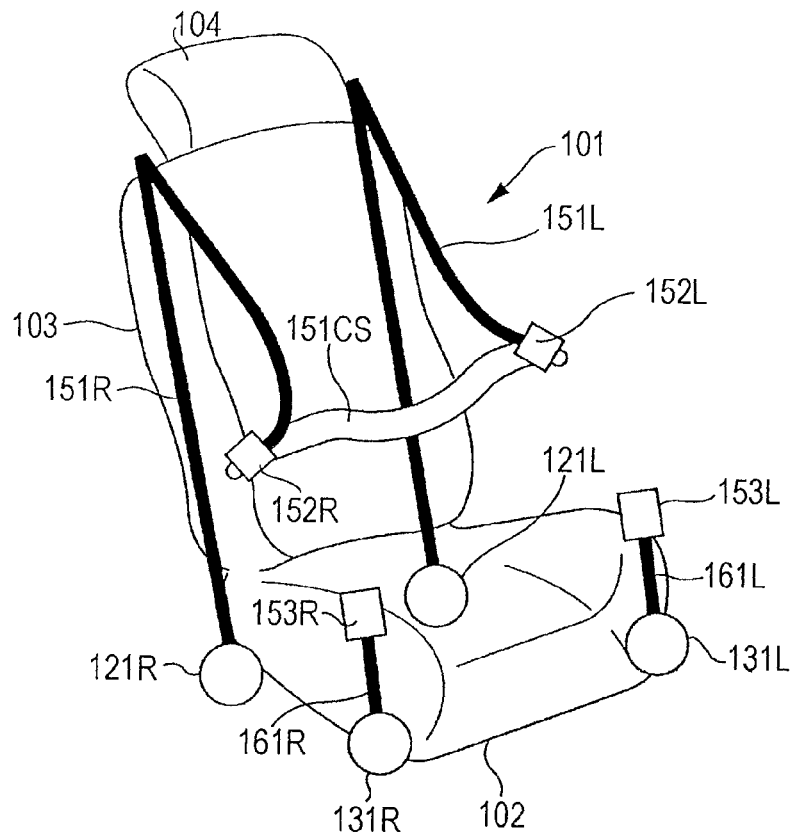
FIG. 25 is an overall perspective view of a four-point seat belt device according to a ninth implementation of the present invention.
Figure 26:
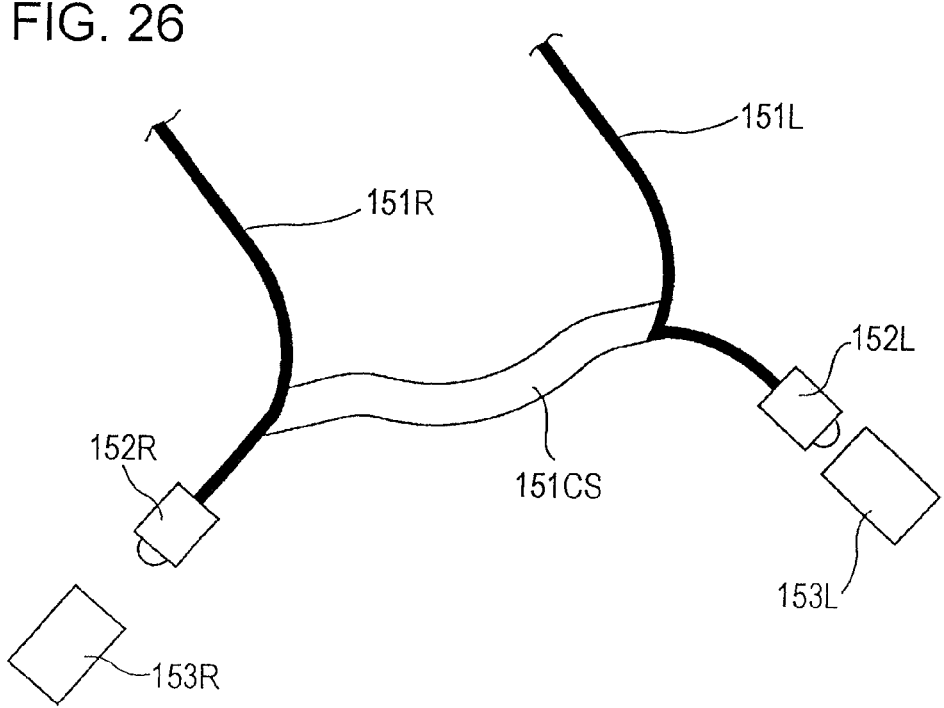
FIG. 26 is a principal portion enlarged view of the four-point seat belt device according to the ninth implementation of the present invention.

FIGS. 25 and 26 illustrate a ninth implementation of the present invention. A four-point seat belt device according to the ninth implementation of the present invention will be described based on FIGS. 25 and 26. In FIG. 25, the same configurations as with FIGS. 17 and 18 are denoted with the reference numerals used in FIGS. 17 and 18, and description thereof will be omitted as appropriate.

FIG. 25 is an overall perspective view of the four-point seat belt device according to the ninth implementation of the present invention. FIG. 26 is a principal portion enlarged view of the four-point seat belt device according to the ninth implementation of the present invention. The right tongue plate 152R is provided to the tip in the extracting direction of the right shoulder belt 151R. The left tongue plate 152L is provided to the tip in the extracting direction of the left shoulder belt 151L. A lap belt 151CS is provided between the right tongue plate 152R and left tongue plate 152L. The right tongue plate 152R and left tongue plate 152L are latched to the right front buckle 153R and left front buckle 153L provided to the tips in the extracting directions of the right front belt 161R and left front belt 161L which are connected to the right front retractor 131R and left front retractor 131L, respectively.

As illustrated in FIG. 26, the lap belt 151CS is formed of a stretchable material. At the time of a collision of the vehicle being detected, the right front belt 161R and left front belt 161L are wound up by the right front retractor 131R and left front retractor 131L, and the right shoulder belt 151R and left shoulder belt 151L are wound up by the right retractor 121R and left retractor 121L, and at the same time, the lap belt 151CS uses stretching properties to catch the passenger.

Tenth Implementation

Figure 27:
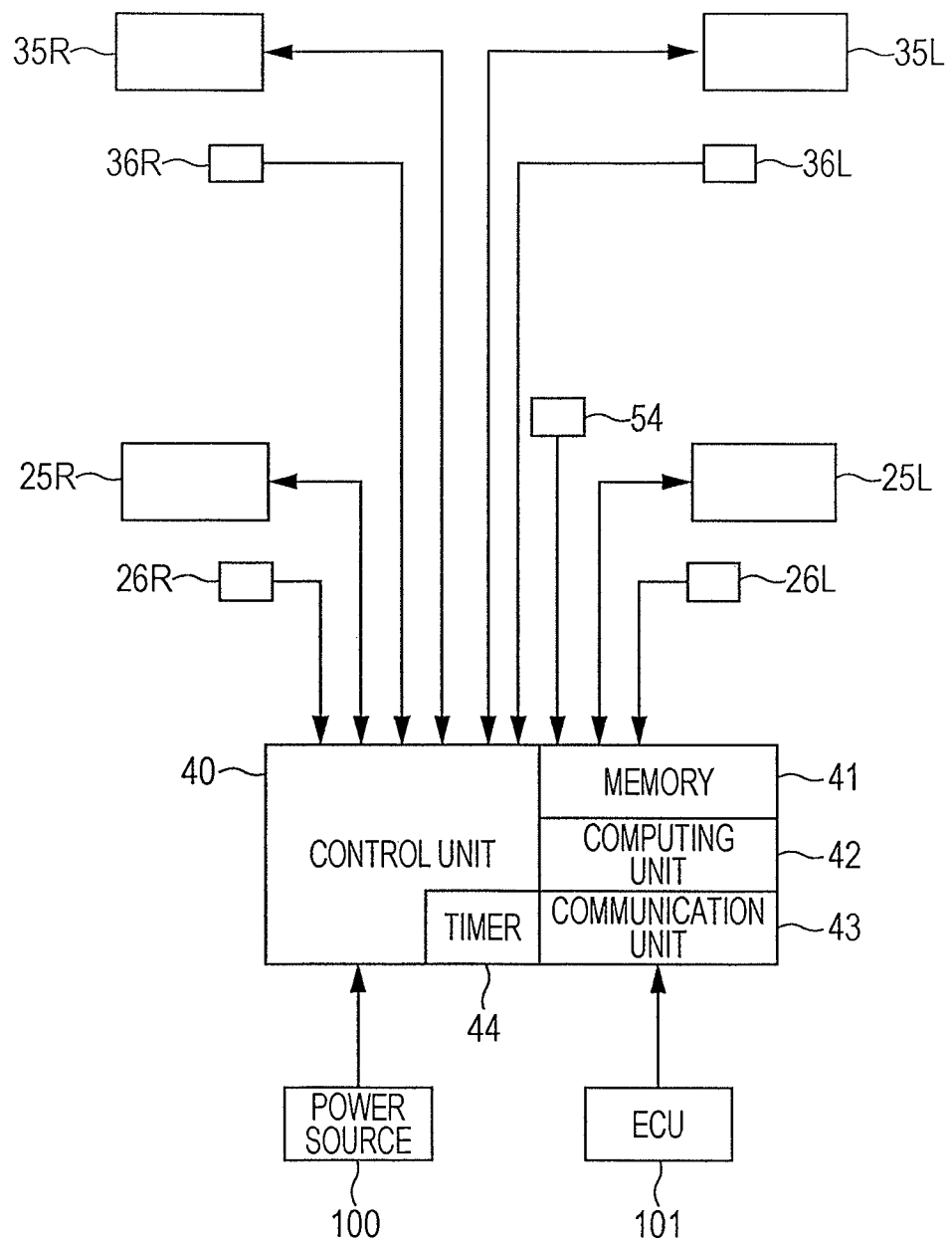
FIG. 27 is a block configuration diagram of a four-point seat belt device according to a tenth implementation of the present invention.
Figure 28:
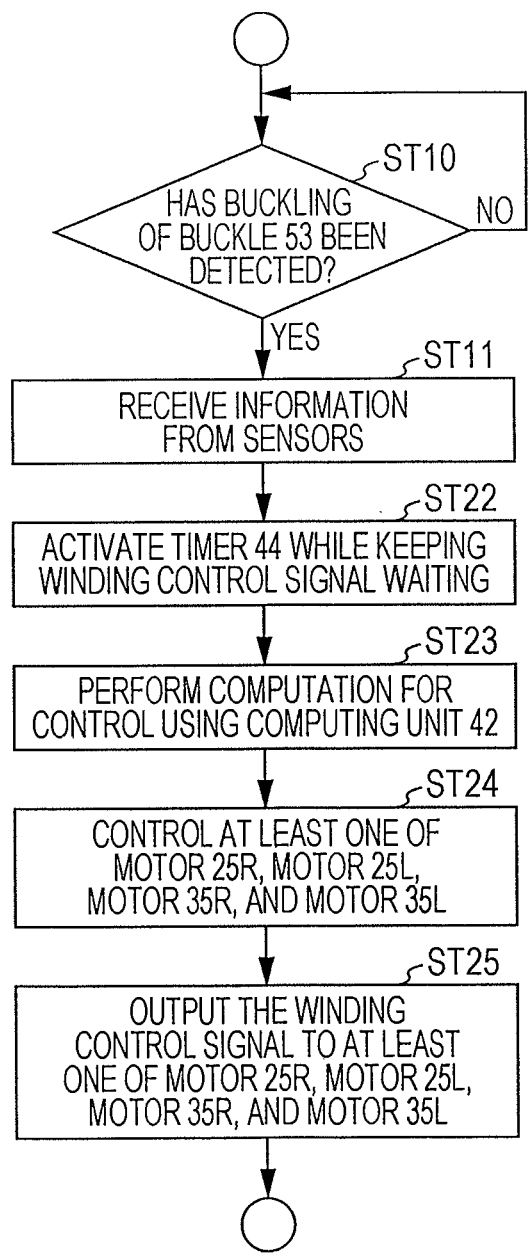
FIG. 28 is a flowchart of the four-point seat belt device according to the tenth implementation of the present invention.

Next, description will be made regarding operation of a four-point seat belt device 1 according to a tenth implementation of the present invention, with reference to FIGS. 6 to 8 and 27 and 28. FIG. 27 is a block configuration diagram of the four-point seat belt device 1 according to the tenth implementation of the present invention. FIG. 28 is a flowchart of the four-point seat belt device 1 according to the tenth implementation of the present invention. The present implementation will be described with reference to the diagrams of operation states as viewed from the side face of the four-point seat belt device 1 according to the first implementation of the present invention in FIGS. 6 to 8. In FIGS. 6 to 8, the same configurations as with FIGS. 1 to 3 are denoted with the reference numerals used in FIGS. 1 to 3, and description thereof will be omitted as appropriate.

First, description will be made regarding the configurations connected to the control unit 40 with the control unit 40 as the center based on FIG. 27. The control unit 40 is configured including memory 41, a computing unit 42, a communication unit 43, and a timer 44. The control unit 40 is activated by receiving supply of power from the power source 100 such as a vehicle battery or the like. Also, the control unit 40 is electrically connected to the electronic control unit (ECU) 101 of the vehicle, and obtains information regarding other units to be controlled by the vehicle. Accordingly, control of the four-point seat belt device 1 can be performed according to the information. Alternatively, information of the four-point seat belt device 1 for the other units to be controlled by the vehicle can be transmitted to the ECU 101. For example, the control unit 40 controls the four-point seat belt device 1 according to a collision detecting signal.

The memory 41 stores information such as information for estimating a body type according to the lengths and tensile force of the right lap belt 51R, left lap belt 51L, right shoulder belt 61R, and left shoulder belt 61L, and body type information of the passenger A, and so forth. The computing unit 42 performs computation based on information of the lengths and tensile force of the right lap belt 51R, left lap belt 51L, right shoulder belt 61R, and left shoulder belt 61L. The communication unit 43 performs communication with the right motor 25R and left motor 25L, right sensor 26R and left sensor 26L, upper right motor 35R and upper left motor 35L, upper right sensor 36R and upper left sensor 36L, latching detecting unit 54, and ECU 101. The timer 44 measures predetermined time from detection by the latching detecting unit 54.

First, overview of the operation of the four-point seat belt device 1 will be described. The control unit 40 recognizes that the tongue plate and buckle which fix the seat belts are connected, and the seat belts are in a fixed state. At this time, the control unit 40 uses a seat belt winding device (uses an actuator, such as a piston or the like, for example) to move the lap belts to the hipbone. After confirming movement, the control unit 40 uses the seat belt winding device to eliminate looseness of the belts (uses an actuator, such as piston or the like, for example). Thus, the control unit 40 can obtain a belt wearing position in accordance with an individual body type, which eliminates manual adjustments by the passenger after wearing of the seat belts. Also, this prevents the belts from having unnecessary looseness, and improves restraint performance at the time of a collision.

Next, an example of the operation of the four-point seat belt device 1 will be described based on the flowchart of the four-point seat belt device 1 according to the tenth implementation of the present invention in FIG. 28. The passenger B whose abdomen protrudes forward sits in the seat cushion 2, and extracts the right lap belt 51R from the right retractor 21R on the seat right side. The passenger B extracts the left lap belt 51L from the left retractor 21L on the seat left side. The passenger B latches the tongue plate 52 provided to the tip in the extracting direction of the right lap belt 51R, and the buckle 53 provided to the tip in the extracting direction of the left lap belt 51L. The latching detecting unit 54 detects latching between the tongue plate 52 and the buckle 53 to output a signal to the control unit 40 (step ST10). Note that, before detection by the latching detecting unit 54, the right retractor 21R, left retractor 21L, upper right retractor 31R, and upper left retractor 31L which are driving units, are in one of the states of wind-up, holding, and uncontrolled.

Upon the passenger B whose abdomen protrudes forward latching the tongue plate 52 and buckle 53, as illustrated in FIG. 6, the right' lap belt 51R and left lap belt 51L in a state in which the tongue plate 52 and buckle 53 are latched come to the upper side of the passenger B's abdomen. In this state, the passenger B's body is not restrained.

The communication unit 43 receives information of extracting length of each belt and tensile force applied to each belt, from the right sensor 26R positioned in the right motor 25R of the right lap belt 51R, the left sensor 26L positioned in the left motor 25L of the left lap belt 51L, the upper right sensor 36R positioned in the upper right motor 35R of the right shoulder belt 61R, and the upper left sensor 36L positioned in the upper left motor 35L of the left shoulder belt 61L (step ST11).

Next, the control unit 40 stands by transmission of a winding control signal for winding of a belt during a predetermined amount of time that the timer 44 measures (step ST22). The timer 44 measures time sufficient for moving the right lap belt 51R and left lap belt 51L to the passenger B's waist under the control of the right lap belt 51R, left lap belt 51L, right shoulder belt 61R, and left shoulder belt 61L according to step ST24 in a subsequent process. During the predetermined time that the timer 44 measures, that is, during transmission of the control signal standing by, the control unit 44 gains time for moving the right lap belt 51R and left lap belt 51L to the passenger B's waist. For example, the control unit 40 stands by transmission of the control signal for time suitable for the right lap belt 51R and left lap belt 51L falling downward due to the weight of the buckle 53.

The computing unit 42 of the control unit 40 performs computation based on the information of the extracting lengths and tensile force (step ST23). Next, the control unit 40 transmits, via the communication unit 43, a signal to at least one of the right motor 25R configured to control the extracting length and tensile force of the right lap belt 51R by driving, the left motor 25L configured to control the extracting length and tensile force of the left lap belt 51L by driving, the upper right motor 35R configured to control the extracting length and tensile force of the right shoulder belt 61R by driving, and the upper left motor 35L configured to control the extracting length and tensile force of the left shoulder belt 61L by driving to control the length and tensile force thereof (step ST24).

For example, during a predetermined amount of time that the timer 44 measures, as illustrated in FIG. 7, the control unit 40 executes step ST24 to change the state of at least one of the right lap belt 51R, left lap belt 51L, right shoulder belt 61R, and left shoulder belt 61L, to a state enabling retracting force in the retracting direction to be loosened or enabling the lengths to be lengthened. Also, the control unit 40 outputs a control signal to at least one of the right motor 25R, left motor 25L, upper right motor 35R, and upper left motor 35L to loosen the driving force thereof. Further, the control unit 40 outputs a control signal to at least one of the right motor 25R, left motor 25L, upper right motor 35R, and upper left motor 35L to change the state thereof to the uncontrolled state. Thus, the seat belts (right lap belt 51R and left lap belt 51L, or right shoulder belt 61R and left shoulder belt 61L) go to a state in which the lengths of the seat belts can readily be lengthened, or are lengthened. Accordingly, the seat belts can readily be positioned forward of the passenger B's abdomen. Also, the seat belts are lengthened and loosened, whereby the right lap belt 51R and left lap belt 51L fall downward due to the weight of the buckle 53.

After elapsing of the predetermined amount of time according to the timer 44, the control unit 40 outputs a winding control signal to at least one of the right motor 25R, left motor 25L, upper right motor 35R, and upper left motor 35L (step ST25). Thus, the control unit 40 winds up either one of the right lap belt 51R and left lap belt 51L, and the right shoulder belt 61R and left shoulder belt 61L, and restrains, as illustrated in FIG. 8, the passenger B so that the right lap belt 51R and left lap belt 51L are downward of the passenger B's abdomen and press the hipbone.

Configuration and Advantage of Implementations

According to the implementations, the four-point seat belt device 1 according includes: two lap belts to press the hipbone of a passenger sitting in a seat; two shoulder belts to press both shoulders of the passenger; a driving unit to perform winding of the lap belts and the shoulder belts; and a latching detecting unit to detect a state in which the lap belts and the shoulder belts are latched via a buckle. The lap belts are temporarily loosened in the case that the latching detecting unit has detected latching. Thus, at the time of a passenger latching the lap belts using the buckle, the lap belts can readily be moved to the waist.

According to the implementations, the four-point seat belt device 1 temporarily loosens the lap belts by enabling at either least one of the lap belts and the shoulder belts to be lengthened, in the case that the latching detecting unit has detected latching. Thus, at the time of a passenger latching the lap belts using the buckle, the lap belts can readily be moved to the waist.

According to the implementations, the driving unit of the four-point seat belt device 1 performs winding driving on the lap belts to reduce looseness after enabling at least one of the lap belts and the shoulder belts to be lengthened, in the case that the latching detecting unit has detected latching. Thus, the passenger's waist can be restrained by the lap belts.

According to the implementations, the driving unit of the four-point seat belt device 1 performs winding driving on the lap belts to reduce looseness after changing the state of at least one of the lap belts and the shoulder belts to an uncontrolled state, in the case that the latching detecting unit has detected latching. Thus, either one of lap belts and shoulder belts can readily be lengthened.

According to the implementations, the driving unit of the four-point seat belt device 1 is a pulley configured to wind up a belt and a motor. Thus, the belts can be wound up, and the passenger's waist can be restrained by the lap belts.

According to the implementations, the four-point seat belt device 1 performs winding driving on the lap belts after loosening driving force to be applied to the belt of at least one motor of the lap belts and the shoulders belts, in the case that the latching detecting unit has detected latching. Thus, the belts can be wound up, and the passenger's waist can be restrained by the lap belts.

According to the implementations, the driving unit of the four-point seat belt device 1 performs operation in one of the states of winding, holding, and uncontrolled, before detection by the latching detecting unit, and in the case that the latching detecting unit has detected latching, temporarily loosen the lap belts by enabling at least one of the lap belts and the shoulder belts to be lengthened. Thus, either one of the lap belts and shoulder belts can readily be lengthened, and the passenger's waist can be restrained by the lap belts.

According to the implementations, the four-point seat belt device 1 further includes: guide member driving unit configured to drive a guide member configured to guide the lap belt, and controls the guide member driving unit to move the lap belts to at least either one of the forward direction and the downward direction, in the case that the latching detecting unit has detected latching. Thus, the belts can be guided to the waist of a passenger with a protruding abdomen as well, and the passenger's waist can be restrained by the lap belts.

According to the implementations, the four-point seat belt device 1 further includes a lap belt moving rail configured to move the lap belts in the forward and backward direction of the vehicle, which is the side face of the seat bottom, and moves the lap belts to the front side of the seat along the lap belt moving rail in response to a signal from the latching detecting unit. Thus, the belts can be guided to the waist of a passenger with a protruding abdomen as well, and the passenger's waist can be restrained by the lap belts.

According to the implementations, The four-point seat belt device 1 includes: two lap belts configured to press the hipbone of a passenger sitting in a seat; two shoulder belts configured to press both shoulders of the passenger; a driving unit configured to perform winding of the lap belts and the shoulder belts; and a latching detecting unit configured to detect a state in which the lap belts and the shoulder belts are latched via a buckle. The lap belts are forcibly moved to the hipbone in the case that the latching detecting unit has detected latching. Thus, at the time of a passenger latching the lap belts using the buckle, the lap belts are forcibly moved to the waist, and the passenger's hipbone can be restrained.

According to the implementations, The four-point seat belt device 1 forcibly intensifies the tensile force of the lap belts to move the lap belts to the hipbone, in the case that the latching detecting unit has detected latching. Thus, at the time of a passenger latching the lap belts using the buckle, the lap belts are forcibly moved to the waist, and the passenger's hipbone can be restrained.

According to the implementations, the driving unit of the four-point seat belt device 1 winds up the lap belts after enabling the lengths of the shoulder belts to be lengthened, in the case that the latching detecting unit has detected latching. Thus, the passenger's waist can be restrained by the lap belts.

According to the implementations, the driving unit of the four-point seat belt device 1 performs winding driving on the lap belts after changing the state of at least one of the lap belts and the shoulder belts to an uncontrolled state, in the case that the latching detecting unit has detected latching. thus, either one of the lap belts and shoulder belts can readily be lengthened.

According to the implementations, the driving unit of the four-point seat belt device 1 is a pulley configured to wind up a belt and a motor. According to the above configuration, the belts can be wound up, and the passenger's waist can be restrained by the lap belts.

According to the implementations, the four-point seat belt device 1 performs winding driving on the lap belts after loosening driving force to be applied to the belt of at least one motor of the lap belts and the shoulders belts, in the case that the latching detecting unit has detected latching. Thus, the belts can be wound up, and the passenger's waist can be restrained by the lap belts.

According to the implementations, the driving unit of the four-point seat belt device 1 performs operation in one of the states of winding, holding, and uncontrolled, before detection by the latching detecting unit, and in the case that the latching detecting unit has detected latching, the driving unit enables at least one of the lap belts and the shoulder belts to be lengthened. Thus, either one of the lap belts and shoulder belts can readily be lengthened, and the passenger's waist can be restrained by the lap belts.

According to the implementations, the four-point seat belt device 1 includes: two lap belts configured to press the hipbone of a passenger sitting in a seat; two shoulder belts configured to press both shoulders of the passenger; a driving unit configured to perform winding of the lap belts and the shoulder belts; and a latching detecting unit configured to detect a state in which the lap belts and the shoulder belts are latched via a buckle. The lap belts are distanced from the passenger in the case that the latching detecting unit has detected latching. Thus, at the time of a passenger latching the lap belts using the buckle, the lap belts can readily be moved to the downward of the passenger's abdomen.

According to the implementations, the four-point seat belt device 1 moves the lap belts at least forward so as to be distanced from the passenger, in the case that the latching detecting unit has detected latching. Thus, at the time of a passenger latching the lap belts using the buckle, the lap belts can readily be moved to the downward of the passenger's abdomen.

According to the implementations, the driving unit of the four-point seat belt device 1 performs winding driving on the lap belts to reduce looseness after enabling at least one of the lap belts and the shoulder belts to be lengthened, in the case that the latching detecting unit has detected latching. Thus, the passenger's waist can be restrained by the lap belts.

According to the implementations, the four-point seat belt device 1 further includes a guide member driving unit configured to drive a guide member configured to guide the lap belt. The guide member driving unit is controlled to move the lap belts to at either one of the forward direction and the downward direction so as to distance the lap belts from a passenger, in the case that the latching detecting unit has detected latching. Thus, the belts can be guided or moved to the waist of a passenger with a protruding abdomen as well.

According to the implementations, the driving unit of the four-point seat belt device 1 is a pulley configured to wind up a belt and a motor. Thus, the belts can be wound up, and the passenger's waist can be restrained by the lap belts.

According to the implementations, the four-point seat belt device 1 performs winding driving on the lap belts after loosening driving force to be applied to the belt of at least one motor of the lap belts and the shoulders belts, in the case that the latching detecting unit has detected latching. Thus, the belts can be wound up, and the passenger's waist can be restrained by the lap belts.

According to the implementations, the driving unit of the four-point seat belt device 1 performs operation in one of the states of winding, holding, and uncontrolled, before detection by the latching detecting unit. In the case that the latching detecting unit has detected latching, the driving unit enables at least one of the lap belts and the shoulder belts to be lengthened. Thus, either one of the lap belts and shoulder belts can readily be lengthened, and the passenger's waist can be restrained by the lap belts.

According to the implementations, the four-point seat belt device 1 further includes a lap belt moving rail configured to move the lap belts in the forward and backward direction of the vehicle, which is the side face of the seat bottom, and moves the lap belts to the front side of the seat along the lap belt moving rail in response to a signal from the latching detecting unit. Thus, the belts can be guided to the waist of a passenger with a protruding abdomen, as well, and the passenger's waist can be restrained by the lap belts.

According to the implementations, the four-point seat belt device 1 includes: two lap belts configured to press the hipbone of a passenger sitting in a seat; two shoulder belts configured to press both shoulders of the passenger; a driving unit configured to perform winding of the lap belts and the shoulder belts; and a latching detecting unit configured to detect a state in which the lap belts and the shoulder belts are latched via a buckle. The lap belts are moved to the hipbone, and winding driving is performed on at least one of the lap belts and the shoulder belts, in the case that the latching detecting unit has detected latching. Thus, at the time of a passenger latching the lap belts using the buckle, the lap belts can readily be moved to the waist.

According to the implementations, the four-point seat belt device 1 performs winding driving on at least one of the lap belts and the shoulder belts after elapsing of a predetermined amount of time from detection, in the case that the latching detecting unit has detected latching. Thus, at the time of a passenger latching the lap belts using the buckle, the lap belts can readily be moved to the waist.

According to the implementations, the driving unit of the four-point seat belt device 1 performs winding driving of the lap belts after changing the state of at least one of the lap belts and the shoulder belts to an uncontrolled state during a predetermined amount of time from detection, in the case that the latching detecting unit has detected latching. Thus, the passenger's waist can be restrained by the lap belts.

According to the implementations, the driving unit of the four-point seat belt device 1 is a pulley configured to wind up a belt and a motor. Thus, the belts can be wound up, and the passenger's waist can be restrained by the lap belts.

According to the implementations, the four-point seat belt device 1 performs winding driving on the lap belts after loosening driving force to be applied to the belt of at least one motor of the lap belts and the shoulders belts during a predetermined amount of time from detection, in the case that the latching detecting unit has detected latching. Thus, the belts can be wound up, and the passenger's waist can be restrained by the lap belts.

According to the implementations, the driving unit of the four-point seat belt device 1 performs operation in one of the states of winding, holding, and uncontrolled, before detection by the latching detecting unit. In the case that the latching detecting unit has detected latching, the driving unit enables at least one of the lap belts and the shoulder belts to be lengthened during a predetermined amount of time from detection. Thus, at the time of a passenger latching the lap belts using the buckle, the lap belts can readily be moved to the waist.

The invention claimed is:

1. A four-point seat belt device comprising:
    first and second shoulder belts;
    a first tongue plate at an extracting end region of the first shoulder belt, and a second tongue plate at an extracting end region of the second shoulder belt;
    a first buckle at an extracting end region of a first front belt for latching with the first tongue plate, and a second buckle at an extracting end region of a second front belt for latching with the second tongue plate;
    at least one restraint element extending between the first and second shoulder belts; and
    a driving unit arrangement for performing belt winding, in response to a collision detection signal, to restrain a passenger by retracting the first and second shoulder belts and retracting the first and second front belts.

2. The four-point seat belt device according to claim 1, wherein,
    the at least one restraint element comprises a lap belt.

3. The four-point seat belt device according to claim 2, wherein,
    the lap belt is secured between the first tongue plate and the second tongue plate.

4. The four-point seat belt device according to claim 2, wherein,
    the at least one restraint element further comprises a vest.

5. The four-point seat belt device according to claim 4, wherein,
    the vest is secured at a first side along a length of the first shoulder belt and at a second side along a length of the second shoulder belt, and
    the vest is detachable from one or both of the first and second shoulder belts.

6. The four-point seat belt device according to claim 1, wherein,
    the at least one restraint element comprises a vest.

7. The four-point seat belt device according to claim 6, wherein,
    the vest is secured at a first side along a length of the first shoulder belt and at a second side along a length of the second shoulder belt, and
    the vest is detachable from one or both of the first and second shoulder belts.

8. The four-point seat belt device according to claim 6, further comprising:
    a hinge for supporting the vest, wherein
    when the first and second tongue plates are unlatched from the first and second buckles, the hinge supports the vest in an erect state extending above a seat backrest, and
    when the first and second tongue plates are latched with the first and second buckles, the hinge supports the vest in a state for covering the passenger's chest.

9. The four-point seat belt device according to claim 1, wherein,
the driving unit arrangement comprises a winding driving unit comprising a pulley and a motor, the winding driving unit being operable to retract a belt.

10. The four-point seat belt device according to claim 9, wherein,
the driving unit arrangement comprises a separate winding driving unit for each front belt and each shoulder belt.

11. A four-point seat belt device comprising:
first and second shoulder belts;
a first tongue plate at an extracting end region of the first shoulder belt, and a second tongue plate at an extracting end region of the second shoulder belt;
a first buckle for latching with the first tongue plate, and a second buckle for latching with the second tongue plate,
at least one restraint element extending between the first and second shoulder belts; and
a shoulder belt adjustment unit for adjusting the positions of the first and second shoulder belts in a widthwise direction for positioning the first and second shoulder belts at widthwise positions corresponding with a passenger's shoulder width, wherein
the shoulder belt adjustment unit comprises a pressure distribution detecting unit for detecting positioning of the passenger's shoulder blades, and a shoulder belt actuator for adjusting positions of the first and second shoulder belts in the widthwise direction based on a detection of the pressure distribution detecting unit.

12. The four-point seat belt device according to claim 11, wherein,
the shoulder belt actuator is positioned at a head cushion of a passenger seat.

13. The four-point seat belt device according to claim 11, wherein,
the at least one restraint element comprises a lap belt.

14. The four-point seat belt device according to claim 13, wherein,
the lap belt is secured between the first tongue plate and the second tongue plate.

15. The four-point seat belt device according to claim 13, wherein,
the at least one restraint element further comprises a vest.

16. The four-point seat belt device according to claim 15, wherein,
the vest is secured at a first side along a length of the first shoulder belt and at a second side along a length of the second shoulder belt, and
the vest is detachable from one or both of the first and second shoulder belts.

17. The four-point seat belt device according to claim 11, wherein,
the at least one restraint element comprises a vest.

18. The four-point seat belt device according to claim 17, wherein,
the vest is secured at a first side along a length of the first shoulder belt and at a second side along a length of the second shoulder belt, and
the vest is detachable from one or both of the first and second shoulder belts.

19. A four-point seat belt device comprising:
first and second shoulder belts;
a first tongue plate at an extracting end region of the first shoulder belt, and a second tongue plate at an extracting end region of the second shoulder belt;
a first buckle for latching with the first tongue plate, and a second buckle for latching with the second tongue plate;
at least one restraint element extending between the first and second shoulder belts; and
a shoulder belt adjustment unit for adjusting the positions of the first and second shoulder belts in a widthwise direction for positioning the first and second shoulder belts at widthwise positions corresponding with a passenger's shoulder width, wherein
the shoulder belt adjustment unit comprises a first paddle and a second paddle for contacting the passenger's shoulders, the first and second paddles being moveable to correspond with positioning of the passenger's shoulders, and
the first and second paddles contact the first and second shoulder belts and adjust the positions of the first and seconds shoulder belts in the widthwise direction upon moving to correspond with positioning of the passenger's shoulders.

20. The four-point seat belt device according to claim 19, wherein,
the first and second paddles are moveable via a rotative motion about a pivot point.

21. A four-point seat belt device comprising:
first and second shoulder belts;
a first tongue plate at an extracting end region of the first shoulder belt, and a second tongue plate at an extracting end region of the second shoulder belt;
a first buckle for latching with the first tongue plate, and a second buckle for latching with the second tongue plate;
at least one restraint element extending between the first and second shoulder belts; and
a shoulder belt adjustment unit for adjusting the positions of the first and second shoulder belts in a widthwise direction for positioning the first and second shoulder belts at widthwise positions corresponding with a passenger's shoulder width, wherein
the at least one restraint element comprises a vest that is supported by a hinge, and
the four-point seat belt device is configured such that:
when the first and second tongue plates are unlatched from the first and second buckles, the hinge supports the vest in an erect state extending above a seat backrest, and
when the first and second tongue plates are latched with the first and second buckles, the hinge supports the vest in a state for covering the passenger's chest.

* * * * *